US 11,001,515 B1

(12) United States Patent
Huntley et al.

(10) Patent No.: US 11,001,515 B1
(45) Date of Patent: May 11, 2021

(54) METHODS FOR USING BACTERIA THAT DEGRADE MICROCYSTIN AND BIOFILTERS UTILIZING SAME

(71) Applicant: The University of Toledo, Toledo, OH (US)

(72) Inventors: Jason F. Huntley, Toledo, OH (US); Alison Thees, Toledo, OH (US)

(73) Assignee: The University of Toledo, Toledo, OH (US)

(*) Notice: Subject to any disclaimer, the term of this patent is extended or adjusted under 35 U.S.C. 154(b) by 0 days.

(21) Appl. No.: 16/508,594

(22) Filed: Jul. 11, 2019

Related U.S. Application Data

(60) Provisional application No. 62/697,032, filed on Jul. 12, 2018.

(51) Int. Cl.
| | | |
|---|---|---|
| *C02F 3/34* | (2006.01) | |
| *C02F 3/10* | (2006.01) | |
| *C02F 3/04* | (2006.01) | |
| *C02F 101/38* | (2006.01) | |

(52) U.S. Cl.
CPC ............... *C02F 3/341* (2013.01); *C02F 3/04* (2013.01); *C02F 3/10* (2013.01); *C02F 2101/38* (2013.01)

(58) Field of Classification Search
CPC .... C02F 3/341; C02F 3/04; C02F 3/10; C02F 2101/38
USPC ............... 210/601, 615, 616, 617, 150, 151; 435/810
See application file for complete search history.

(56) References Cited

U.S. PATENT DOCUMENTS

| 3,849,195 A | * | 11/1974 | Powell, Jr. | ........... A23N 12/023 134/1 |
| 2006/0096915 A1 | * | 5/2006 | Sumino | ................... C02F 3/108 210/601 |
| 2020/0156960 A1 | * | 5/2020 | Smith | ..................... C02F 1/285 |

OTHER PUBLICATIONS

Dziga et al., Microbial Degradation of Microcystins, Chemical Research in Toxicology, 26, 6, (2013), pp. 841-852.*
Edwards et al., Chapter 4 Bioremediation of Cyanotoxins, Advances in Applied Microbiology, vol. 67, (2009), pp. 109-120.*

* cited by examiner

*Primary Examiner* — Fred Prince
(74) *Attorney, Agent, or Firm* — MacMillan, Sobanski & Todd, LLC

(57) ABSTRACT

Materials and methods for degrading a microcystin compound, and filtering microcystin from water, are described.

21 Claims, 21 Drawing Sheets
(17 of 21 Drawing Sheet(s) Filed in Color)
Specification includes a Sequence Listing.

METHODS FOR USING BACTERIA THAT DEGRADE MICROCYSTIN AND BIOFILTERS UTILIZING SAME

RELATED APPLICATIONS

This application claims priority to U.S. Provisional Application No. 62/697,032 filed under 35 U.S.C. § 111(b) on Jul. 12, 2018, the disclosure of which is incorporated herein by reference in its entirety.

STATEMENT REGARDING FEDERALLY SPONSORED RESEARCH

This invention was made with no government support. The government has no rights in this invention.

STATEMENT REGARDING SEQUENCE LISTING

The instant application contains a Sequence Listing which is hereby incorporated by reference in its entirety. The ASCII copy, created on Jul. 10, 2019, is named 60290-US—NP_D2018-52_SL.txt, and is 2,077 bytes in size.

```
8F                                  (SEQ ID NO: 1)
(5'-AGAGTTTGATCCTGGCTCAG-3');

1492R                               (SEQ ID NO: 2)
(5'-GGTTACCTTGTTACGACTT-3');

mirA F1                             (SEQ ID NO: 3)
(5'-GACCCGATGTTCAAGATGCT-3');

mirA R3                             (SEQ ID NO: 4)
(5'-CTCCTCCCACAAATCAGGAC-3');

mirB F1                             (SEQ ID NO: 5)
(5'-ATCCGCACCTATCTGCCTGAC-3');

mirB R2                             (SEQ ID NO: 6)
(5'-GTCGCCATAGCCTTGCCAG-3');

mliC F1                             (SEQ ID NO: 7)
(5'-GCTTGATCGTCGAACATTGATGG-3');

mliC R2                             (SEQ ID NO: 8)
(5'-CGGCATGGCGAAGGCAC-3').
```

BACKGROUND

Harmful algal blooms (HABs) occur in a variety of aquatic environments and are characterized as large aggregations of naturally-occurring photosynthetic bacteria that release neurotoxic and hepatotoxic compounds (cyanotoxins) into water bodies. Changes in climate and eutrophication have greatly increased both the incidence and toxicity of HABs over the past few decades, highlighting that human health risks will continue to increase in the future. Cyanobacteria, including *Microcystis* and Planktothrix, are well-documented to thrive in eutrophic bodies of waters and release various cyanotoxins, including the hepatotoxic microcystins (MCs). MCs are cyclic, seven amino acid-containing structures, with the generic structure cyclo(D)-Ala-X-(D)-erythro-β-methyl-iso-Asp-Y-ADDA-(D)-iso-Glu-N-methyldehydro-Ala; X and Y indicate the two variable L-amino acid positions in MCs, while ADDA is (all-S,all-E)-3-Amino-9-methoxy-2,6,8-trimethyl-10-phenyldeca-4,6-dienoic acid. Whereas over 100 MC variants have been documented to date, each with differing levels of toxicity, MC-LR is the most toxic, most common, and most closely linked to liver cancer and other diseases in both humans and animals. MC-LR exerts its harmful effects by binding to type 1 and 2A protein phosphatases (PP1 and PP2A, respectively) in the liver, resulting in excessive phosphorylation. Loss of these functions can result in death in mammals and liver cancer, hemorrhage, and hypovolemic shock in humans.

HABs have been documented in most parts of the world as highlighted by the World Health Organization (WHO), with notable bloom events in China, Australia, Spain, and Argentina. In the United States, HABs have been reported across the country, including large and/or persistent blooms in Florida, California, Ohio, Iowa, Maryland, Minnesota, New York, North Carolina, Oregon, Virginia, Wisconsin, Kansas, Montana, and Texas. For decades, eutrophication of Lake Erie has resulted in large and toxic HABs that have negatively affected recreational activities, led to anoxic/hypoxic conditions that kill fish and other wildlife, and fouled drinking water. Indeed, during the summer of 2014, an especially large and toxic HAB in Lake Erie released high concentrations of MC-LR into the city of Toledo, Ohio's municipal water inlet, resulting in MC-LR levels in the finished drinking water exceeding the World Health Organization's guideline level for safe drinking water (1 µg/L; 1 part per billion [ppb]). As a result of MC-LR levels >2 ppb in finished drinking water, the city of Toledo issued a three-day "do not drink" advisory that negatively impacted more than 400,000 residents and hundreds of businesses. In June 2015, the U.S. Environmental Protection Agency (EPA) issued a 10-day drinking water health advisory guideline for microcystins, which outlined no more than 0.3 ppb/day for children <6 years old and no more than 1.6 ppb/day for school-aged children (>6 years old) through adults.

The ability of MC-LR to persist in bodies of water for an extended period is due to its stable cyclic structure. Previous studies have demonstrated that the half-life of MC-LR in natural water with direct sunlight is 90-120 days per meter water depth. MCs have demonstrated resistance to various physical and chemical processes including sunlight, extreme pH, and high temperatures. Due to the stability of MC-LR, municipal water treatment plants have had to implement a number of treatment options for removal, including ozonation, powdered activated carbon, sedimentation, sand filtration, and chemical coagulation to remove MC-LR from the finished product. Of these processes, chemical coagulation followed by flocculation removes only small amounts of cyanobacterial toxins. By comparison, methods such as chemical coagulation, powdered activated carbon, sand filtration, and sedimentation, particularly when used in combination, have proven to be relatively effective at MC-LR removal. However, MC-LR removal can be reduced by the presence of other naturally-occurring organic materials in the water. In addition, studies have shown that ozonation of MC-LR results in the production of formaldehydes, spent powdered activated carbon must be properly disposed of because of high concentrations of MC-LR according to the Ohio EPA, and all of these MC-LR removal processes have doubled or tripled water costs. Given these issues, there is a clear need in the art to develop safer, more efficient, and cost-effective methods to remove MC-LR from drinking water.

SUMMARY

Provided is a biofilter comprising a medium, and a biofilm on the medium, where the biofilm is formed from a group of bacteria capable of degrading a microcystin compound when combined together, wherein the group of bacteria comprises one of: (i) *Flectobacillus roseus*, *Leadbetterella byssophila*, *Pseudomonas hunanensis*, and *Pseudomonas abietaniphila*; (ii) *Pseudomonas* sp. [similar to CC15M4], *Pseudomonas putida*, *Runella* sp. [similar to THWCSN44], and *Sphingobium yanoikuyae*; or (iii) *Flectobacillus* sp., *Porphyrobacter* sp., *Pseudomonas migulae*, and *Sphingobium yanoikuyae*. In certain embodiments, the group of bacteria comprises (i) *Flectobacillus roseus*, *Leadbetterella byssophila*, *Pseudomonas hunanensis*, and *Pseudomonas abietaniphila*. In certain embodiments, the group of bacteria comprises (ii) *Pseudomonas* sp. [similar to CC15M4], *Pseudomonas putida*, *Runella* sp. [similar to THWCSN44], and *Sphingobium yanoikuyae*. In certain embodiments, the group of bacteria comprises (iii) *Flectobacillus* sp., *Porphyrobacter* sp., *Pseudomonas migulae*, and *Sphingobium yanoikuyae*. In certain embodiments, the microcystin compound is MC-LR.

In certain embodiments, the medium comprises sand, gravel, polyurethane foam, peat, compost, woodchips, seashells, plastics, pumice, siliconized glass, or a combination thereof. In certain embodiments, the medium is disposed on a substrate. In particular embodiments, the substrate is a perforated plate or a porous paper.

In certain embodiments, the group of bacteria comprises bacteria species that individually do not degrade microcystin.

In certain embodiments, the group of bacteria further includes one or more of: *Acinetobacter haemolyticus*, *Acinetobacter johnsonii*, *Agrobacterium albertimagni*, *Asticcacaulis biprosthecium*, *Bacillus cereus*, *Bacillus mycoides*, *Brevundimonas nasdae*, *Brevundimonas subvibrioides*, *Dyadobacter fermentans*, *Emticicia oligotrophica*, *Emticicia sediminis*, *Flavobacterium akiainvivens*, *Flectobacillus roseus*, *Flectobacillus* sp., *Gemmobacter* sp., *Hydrogenophage intermedia*, *Ideonella paludis*, *Leadbetterella byssophila*, *Microbacterium hominis*, *Microbacterium proteolyticum*, *Microbacterium testaceum*, *Microbacterium trichothecenolyticum*, *Novosphingobium aromaticivorans*, *Novosphingobium resinovorum*, *Porphyrobacter* sp., *Pseudomonas abietaniphila*, *Pseudomonas alcaligenes*, *Pseudomonas alkylphenolia*, *Pseudomonas hunanensis*, *Pseudomonas migulae*, *Pseudomonas pecoglossicida*, *Pseudomonas putida*, *Pseudomonas rhizosphaerae*, *Pseudomonas salomonii*, *Pseudomonas* sp [similar to CC15M4], *Rhizobium selenitireducens*, *Rhizobium* sp., *Runella* sp. [similar to THWCSN44], *Shinella* sp., *Sphingobium xenophagum*, *Sphingobium yanoikuyae*, or *Variovorax paradoxus*.

In certain embodiments, the biofilter comprises a column packed with a plurality of media. In particular embodiments, the biofilm is formed on more than one of the plurality of media.

In certain embodiments, the biofilter comprises a permeable tube defining a tubular channel, wherein the medium is adhered to an outer surface of the permeable tube.

Further provided is a method of filtering water to remove microcystin, the method comprising passing water through a filter comprising a biofilm formed from a group of bacteria capable of degrading a microcystin compound, wherein the group of bacteria comprises bacteria which do not individually degrade the microcystin compound. In certain embodiments, the group of bacteria comprises *Flectobacillus roseus*, *Leadbetterella byssophila*, *Pseudomonas hunanensis*, and *Pseudomonas abietaniphila*. In certain embodiments, the group of bacteria comprises *Pseudomonas* sp. [similar to CC15M4], *Pseudomonas putida*, *Runella* sp. [similar to THWCSN44], and *Sphingobium yanoikuyae*. In certain embodiments, the group of bacteria comprises *Flectobacillus* sp., *Porphyrobacter* sp., *Pseudomonas migulae*, and *Sphingobium yanoikuyae*. In certain embodiments, the microcystin compound is MC-LR.

In certain embodiments, the group of bacteria further includes one or more of: *Acinetobacter haemolyticus*, *Acinetobacter johnsonii*, *Agrobacterium albertimagni*, *Asticcacaulis biprosthecium*, *Bacillus cereus*, *Bacillus mycoides*, *Brevundimonas nasdae*, *Brevundimonas subvibrioides*, *Dyadobacter fermentans*, *Emticicia oligotrophica*, *Emticicia sediminis*, *Flavobacterium akiainvivens*, *Flectobacillus roseus*, *Flectobacillus* sp., *Gemmobacter* sp., *Hydrogenophage intermedia*, *Ideonella paludis*, *Leadbetterella byssophila*, *Microbacterium hominis*, *Microbacterium proteolyticum*, *Microbacterium testaceum*, *Microbacterium trichothecenolyticum*, *Novosphingobium aromaticivorans*, *Novosphingobium resinovorum*, *Porphyrobacter* sp., *Pseudomonas abietaniphila*, *Pseudomonas alcaligenes*, *Pseudomonas alkylphenolia*, *Pseudomonas hunanensis*, *Pseudomonas migulae*, *Pseudomonas pecoglossicida*, *Pseudomonas putida*, *Pseudomonas rhizosphaerae*, *Pseudomonas salomonii*, *Pseudomonas* sp [similar to CC15M4], *Rhizobium selenitireducens*, *Rhizobium* sp., *Runella* sp. [similar to THWCSN44], *Shinella* sp., *Sphingobium xenophagum*, *Sphingobium yanoikuyae*, or *Variovorax paradoxus*.

Further provided is a kit for filtering water, the kit comprising a first container housing a substrate; and a second container housing a biologic medium comprising a biofilm formed from a group of bacteria capable of degrading a microcystin compound when combined together. In certain embodiments, the group of bacteria is selected from (i) *Flectobacillus roseus*, *Leadbetterella byssophila*, *Pseudomonas hunanensis*, and *Pseudomonas abietaniphila*; (ii) *Pseudomonas* sp. [similar to CC15M4], *Pseudomonas putida*, *Runella* sp. [similar to THWCSN44], and *Sphingobium yanoikuyae*; or (iii) *Flectobacillus* sp., *Porphyrobacter* sp., *Pseudomonas migulae*, and *Sphingobium yanoikuyae*. In certain embodiments, the microcystin compound is MC-LR.

In certain embodiments, the group of bacteria further includes one or more of: *Acinetobacter haemolyticus*, *Acinetobacter johnsonii*, *Agrobacterium albertimagni*, *Asticcacaulis biprosthecium*, *Bacillus cereus*, *Bacillus mycoides*, *Brevundimonas nasdae*, *Brevundimonas subvibrioides*, *Dyadobacter fermentans*, *Emticicia oligotrophica*, *Emticicia sediminis*, *Flavobacterium akiainvivens*, *Flectobacillus roseus*, *Flectobacillus* sp., *Gemmobacter* sp., *Hydrogenophage intermedia*, *Ideonella paludis*, *Leadbetterella byssophila*, *Microbacterium hominis*, *Microbacterium proteolyticum*, *Microbacterium testaceum*, *Microbacterium trichothecenolyticum*, *Novosphingobium aromaticivorans*, *Novosphingobium resinovorum*, *Porphyrobacter* sp.,

*Pseudomonas abietaniphila, Pseudomonas alcaligenes, Pseudomonas alkylphenolia, Pseudomonas hunanensis, Pseudomonas migulae, Pseudomonas pecoglossicida, Pseudomonas putida, Pseudomonas rhizosphaerae, Pseudomonas salomonii, Pseudomonas* sp [similar to CC15M4], *Rhizobium selenitireducens, Rhizobium* sp., *Runella* sp. [similar to THWCSN44], *Shinella* sp., *Sphingobium xenophagum, Sphingobium yanoikuyae,* or *Variovorax paradoxus*.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

FIG. 1A shows water samples collected from scum events in the western basin of Lake Erie during the summers of 2014 and 2015 at the indicated sites. FIG. 1B shows water samples either not treated (raw water) or pre-filtered using a 1 μm filter, incubated at 20-22° C. with continuous stirring and 8 h-16 h light-dark cycles, and 50 μg/L [ppb] MC-LR was added to each sample every 3-4 days for 3 weeks. Samples were plated onto R2A agar at the beginning (raw water) and end (week 3) of the experiment to assess changes in bacterial colony morphologies following continuous MC-LR addition. Representative colonies from CRIB sample are shown. FIG. 1C shows aliquots were harvested from each sample once per week, 10-fold serially-diluted, and dilutions were plated onto R2A agar to enumerate bacterial numbers (colony forming units; CFU) during the selection process. FIG. 1D shows aliquots were harvested from each sample before and after MC-LR addition (50 ppb per addition; indicated by arrows) for 21 days. MC-LR concentrations in samples were quantitated by ADDA ELISA.

FIG. 3A shows 22 clones/group, FIG. 3B shows 11 clones/group, FIG. 3C shows 4-5 clones/group, and FIG. 3D shows individual bacterial clones. Aliquots were harvested before and after MC-LR addition (indicated by arrows) and MC-LR concentrations were quantitated by ADDA ELISA. The solid grey lines are a linear regression analysis of quantitated MC-LR levels in the Neg Ctrl. The dashed colored lines indicate quantitated MC-LR levels immediately after each MC-LR addition and 3-4 days later. FIG. 3E shows individual bacterial clones over 25 and 15 days, and FIG. 3F shows groups of bacterial clones over 70 and 25 days.

FIG. 4B shows biofilm formation by individual bacteria clones. FIG. 4C shows biofilm formation of other bacteria clones. Samples were incubated for 28 days at 20-22° C. with continuous stirring and 8 h:16 h light:dark cycles. Once per week, 2 ml of spent lake water was removed and 2 ml of fresh, sterile-filtered lake water was added to each culture to promote bacterial growth. Biofilm growth was quantitated by crystal violet staining and $OD_{570}$ measurements.

FIG. 5A shows sterile-filtered lake water was either not inoculated (Neg Ctrl) or inoculated with bacterial groups 5c11, 5c12, or 5c14, incubated for 22 days at 20-22° C. with continuous stirring, 8 h:16 h light:dark cycles, and approx. 16 ppb MC-LR was added (indicated by arrows) to each culture on the designated days. Aliquots were harvested before and after each MC-LR addition and MC-LR concentrations were quantitated by mass spectrometry (MS). The solid grey line indicates a linear regression analysis of MC-LR in the negative control sample (Neg Ctrl). The dashed blue line indicates changes in MC-LR concentrations after each MC-LR addition. FIGS. 5B-5C shows secondary ion mass spectrometry (SIM) analysis of 5c14 cultures detected MC-LR breakdown products. FIG. 5B shows a SIM chromatogram from Day 1 aliquot, immediately after MC-LR addition. 995 m/z peak at 1.5 minutes indicates native, cyclic MC-LR. FIG. 5C shows a SIM chromatogram from Day 16 aliquot, 3 days after MC-LR addition. 615 m/z peak at 1.6 minutes indicates tetrapeptide biodegradation product and 1013 m/z peak at 2.5 minutes indicates linearized MC-LR. 995 m/z was not detected.

DETAILED DESCRIPTION

Figure 1A:
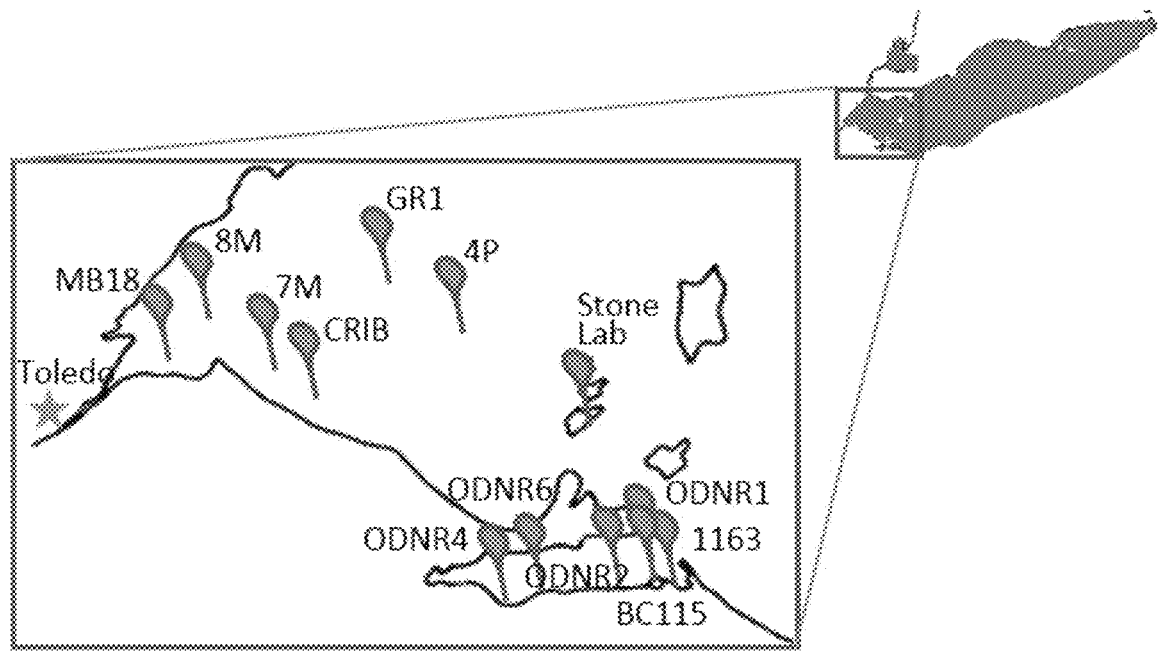
FIGS. 1A-1D: Repeated MC-LR addition selects for MC-LR degrading bacteria.

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

The first evidence for bacteria that could degrade MC-LR was published by an Australian group that harvested samples from a *Microcystis aeruginosa*-dominated river HAB. Following incubation of those samples in the presence of *M. aeruginosa* extracts (including MC-LR), that group isolated a *Sphingomonas* sp. that was able to utilize MC-LR as a sole source of nutrients. In follow-up studies, that same group identified the mlrABCD operon, encoding three intracellular hydrolytic enzymes and a putative oligopeptide transport protein, which are responsible for MC-LR degradation in this *Sphingomonas* sp. MC-LR degradation was found to occur in a stepwise manner, with a microcystinase (encoded by mlrA) initially cleaving cyclic MC-LR ($LD_{50}$ of 75 µg/kg when injected into mice intraperitoneally) into a linearized form (160-times less toxic than cyclic MC-LR), a serine hydrolase (encoded by mlrB) cleaving linear MC-LR into a tetrapeptide (20-times less toxic than cyclic MC-LR), and a metalloprotease (encoded by mlrC) further degrading the tetrapeptide into smaller fragments, such as ADDA ($LD_{50}$ 133 times greater than cyclic MC-LR). Finally, to evaluate the potential utility of *Sphingomonas* sp. to biodegrade MC-LR from contaminated water, sand filters inoculated with *Sphingomonas* sp. were found to remove 90% of MC-LR from river water within 2 days, compared with uninoculated sand filters. MC-LR degradation is not unique to *Sphingomonas* sp. or to Australia, as researchers in China isolated a *Stenotrophomonas* sp. from a Lake Taihu HAB that degraded both MC-LR and MC-RR. In addition, MC-LR degrading bacteria have been isolated from Argentina and Spain.

All of the aforementioned studies were performed great distances from the Great Lakes and major differences in water chemistries, nutrient loading, and microbial compositions exist among eutrophic water bodies. Lake Erie contains distinct MC-LR degrading bacteria and/or MC-LR degradation enzymes. One previous study attempted to address this possibility by collecting water samples from a 2010 Lake Erie HAB, incubating those samples with MC-LR, quantitating MC-LR levels during a 48 hour incubation, and performing metagenomic sequencing to correlate bacterial taxonomy with potential MC-LR degradation pathways. While results from that showed some MC-LR degradation by Lake Erie bacteria, a number of unanswered questions remain. First, the short duration (48 hours) of MC-LR incubation likely only allowed for bacterial gene regulation changes, and not substantive changes in microbial populations that use MC-LR as a nutrient source. As such, it is unclear what bacterial strains or populations were correlated with MC-LR reductions. Second, it is unclear if observed reductions in MC-LR concentrations were due to bacterial adsorption or if true enzymatic degradation of MC-LR occurred. Third, although metagenomic sequencing revealed increased abundance of various phyla in MC-LR-containing cultures in that study, the order *Sphingomonadales* (of which MC-LR degrading *Sphingomonas* sp. are members) were only a minor fraction of that microbial population and increased <1% in MC-LR containing cultures. As such, the previously-described MC-LR degrading bacteria are unlikely to degrade MC-LR in Lake Erie, and it was not known what Lake Erie bacteria strains or populations could degrade MC-LR. Finally, putative mlrABCD genes were not significantly detected in any of those Lake Erie samples, leaving major questions about what bacteria and enzymatic pathways may exist in Lake Erie to possibly degrade MC-LR.

The present disclosure describes enriching and isolating MC-LR-degrading bacteria from Lake Erie HAB events. Because of increasing numbers and sizes of HAB events, bacteria exist in Lake Erie that use MC-LR as a source of nutrients. Following a rigorous MC-LR selection process, individual bacterial clones were isolated, and MC-LR degradation by groups of bacterial clones was confirmed. These results indicate that MC-LR degrading bacteria may be used to remove MC-LR from drinking water supplies.

Provided herein are groups of bacteria that are capable of degrading a microcystin compound, such as MC-LR, when combined together. In some embodiments, the groups of bacteria include individual bacteria which do not degrade microcystin alone.

The groups of bacteria described herein may include the group referred to as 5c11, which includes *Flectobacillus roseus, Leadbetterella byssophila, Pseudomonas hunanensis*, and *Pseudomonas abietaniphila*. When combined together, these bacteria degrade microcystin, but when used individually, these bacteria do not degrade microcystin.

The groups of bacteria described herein may include the group referred to as 5c12, which includes *Pseudomonas* sp. [similar to CC15M4], *Pseudomonas putida, Runella* sp [similar to THWCSN44], and *Sphingobium yanoikuyae*. When combined together, these bacteria degrade microcystin, but when used individually, these bacteria do not degrade microcystin.

The groups of bacteria described herein may include the group referred to as 5c14, which includes *Flectobacillus* sp., *Porphyrobacter* sp., *Pseudomonas migulae*, and *Sphingobium yanoikuyae*. When combined together, these bacteria degrade microcystin, but when used individually, these bacteria do not degrade microcystin.

Other groups of bacteria that are capable of degrading a microcystin compound are provided herein, and are displayed in Table 1 in the examples herein. Furthermore, any of the groups of bacteria described herein may further include one or more additional bacteria such as *Acinetobacter haemolyticus, Acinetobacter johnsonii, Agrobacterium albertimagni, Asticcacaulis biprosthecium, Bacillus cereus, Bacillus mycoides, Brevundimonas nasdae, Brevundimonas subvibrioides, Dyadobacter fermentans, Emticicia oligotrophica, Emticicia sediminis, Flavobacterium akiainvivens, Flectobacillus roseus, Flectobacillus* sp., *Gemmobacter* sp., *Hydrogenophage intermedia, Ideonella paludis, Leadbetterella byssophila, Microbacterium hominis, Microbacterium proteolyticum, Microbacterium testaceum, Microbacterium trichothecenolyticum, Novosphingobium aromaticivorans, Novosphingobium resinovorum, Porphyrobacter* sp., *Pseudomonas abietaniphila, Pseudomonas alcaligenes, Pseudomonas alkylphenolia, Pseudomonas hunanensis, Pseudomonas migulae, Pseudomonas pecoglossicida, Pseudomonas putida, Pseudomonas rhizosphaerae, Pseudomonas salomonii, Pseudomonas* sp [similar to CC15M4], *Rhizobium selenitireducens, Rhizobium* sp., *Runella* sp. [similar to THWCSN44], *Shinella* sp., *Sphingobium xenophagum*, *Sphingobium yanoikuyae*, or *Variovorax paradoxus*.

Further provided are biofilters useful for filtering water that include one or more bacteria capable of degrading a microcystin compound, such as MC-LR. A biofilter is a filter in which the surface of the filter material develops a biological film (biofilm) of bacteria which feed on a certain pollutant (such as microcystin) in the water being filtered by the biofilter. In some embodiments, a biofilter includes a group of bacteria capable of degrading a microcystin compound when combined together, but which includes bacteria that are not capable of degrading the microcystin compound individually.

In general, the biofilter may include a biologic medium, such as sand, gravel, polyurethane foam, peat, compost, woodchips, seashells, plastics, pumice, siliconized glass, or a combination thereof, with a biofilm of bacteria on the medium. The medium is any suitable medium which allows the bacteria to attach, grow, and develop into a well-established biofilm. The medium may be on a substrate, such as a perforated plate or a porous paper. Any known water filter system can be utilized with a biofilm formed from a group of bacteria as described herein. For improved results, the biofilter should provide a high surface area with water flow distribution over the biofilm, and the biofilm should be uniform and stable.

In one non-limiting example, the biofilter includes a highly perforated plate with sand, gravel, or a combination thereof having a biofilm thereon retained on the plate. Water may be directed from a space below the plate and drawn through the media where the biofilter bacteria reside.

In another non-limiting example, the biofilter is a foam filter in which water is drawn through a block of open-celled polyurethane foam (serving as the biologic medium). The block may vary in shape and size.

In another non-limiting example, the biofilter is a trickle filter which uses a container that serves as a tower to hold most of the biologic medium, where water is evenly distributed across the top surface of the medium via a spray bar or through a perforated diffuser plate. The water may then drip evenly down through the exposed medium, mixing with the air as the water contacts the exposed medium.

In another non-limiting example, the biofilter is a biowheel filter, also known as a rotating biologic contactor, in which a disc or cylinder of rigid biofilter medium is positioned half in and half out of the water to be filtered, with its axis at the surface. The biowheel filter is slowly turned using a system water pump, motor, or air-driven rotation disc, exposing all surfaces of the medium intermittently to water and air.

In another non-limiting example, the biofilter is a fluidized sand bed filter, which is a device having a reactor column through which the system water is injected through the bottom into a suitable biologic medium such as fine quartz silica sand. The upwelling water column expands the sand bed upward as it passes through, and then exits out the top to return to the system.

Figure 7:
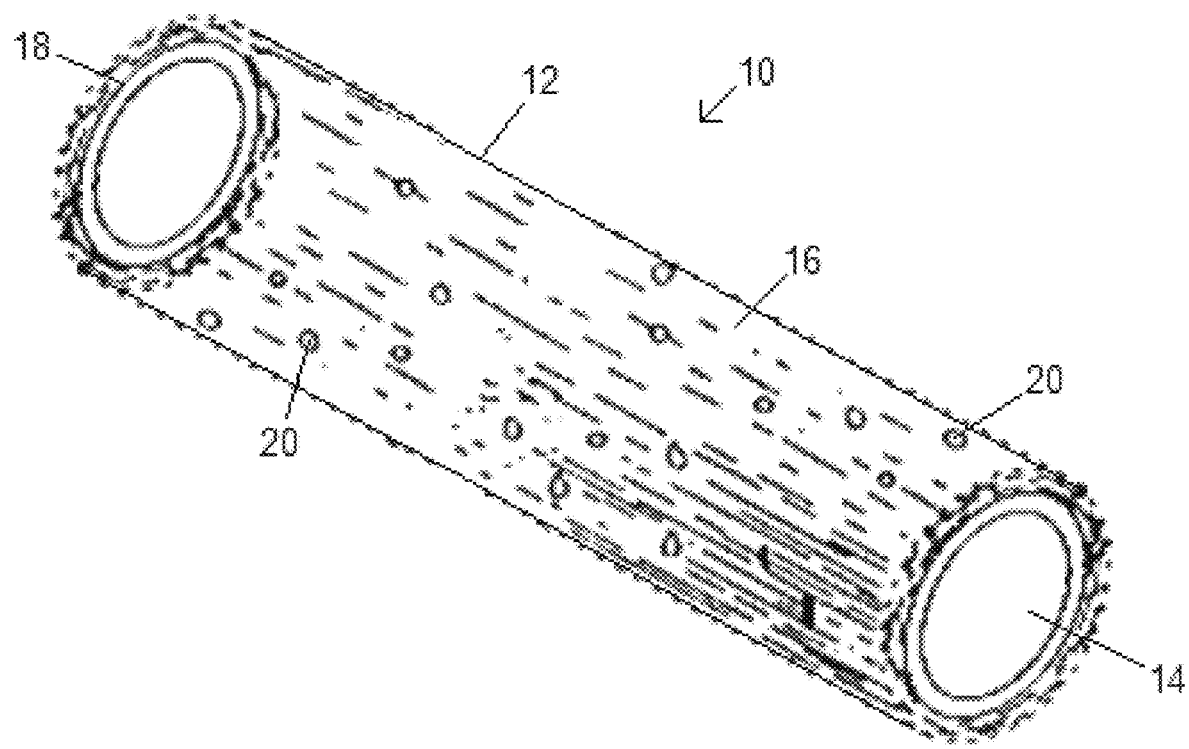
FIG. 7: Illustration of a non-limiting example of a biofilter as described herein.

FIG. 7 illustrates a non-limiting example embodiment of a biofilter 10. Referring now to FIG. 7, the biofilter 10 may include a permeable flexible tube 12 defining a tubular channel 14. A biologic medium 16 is adhered to the outer surface 18 of the permeable flexible tube 12. The permeable flexible tube 12 includes pores 20 which allow the passage of water therethrough. The biologic medium 16 includes a material such as sand with a biofilm formed thereon from a group of bacteria capable of degrading a microcystin compound when combined together. Water may flow against the permeable flexible tube 12 where the water contacts the biologic medium 16 at which point the biofilm filters microcystin out of the water. The filtered water then passes through the pores 20 into the tubular channel 14, where the filtered water may be directed to a desired location.

Figure 8:
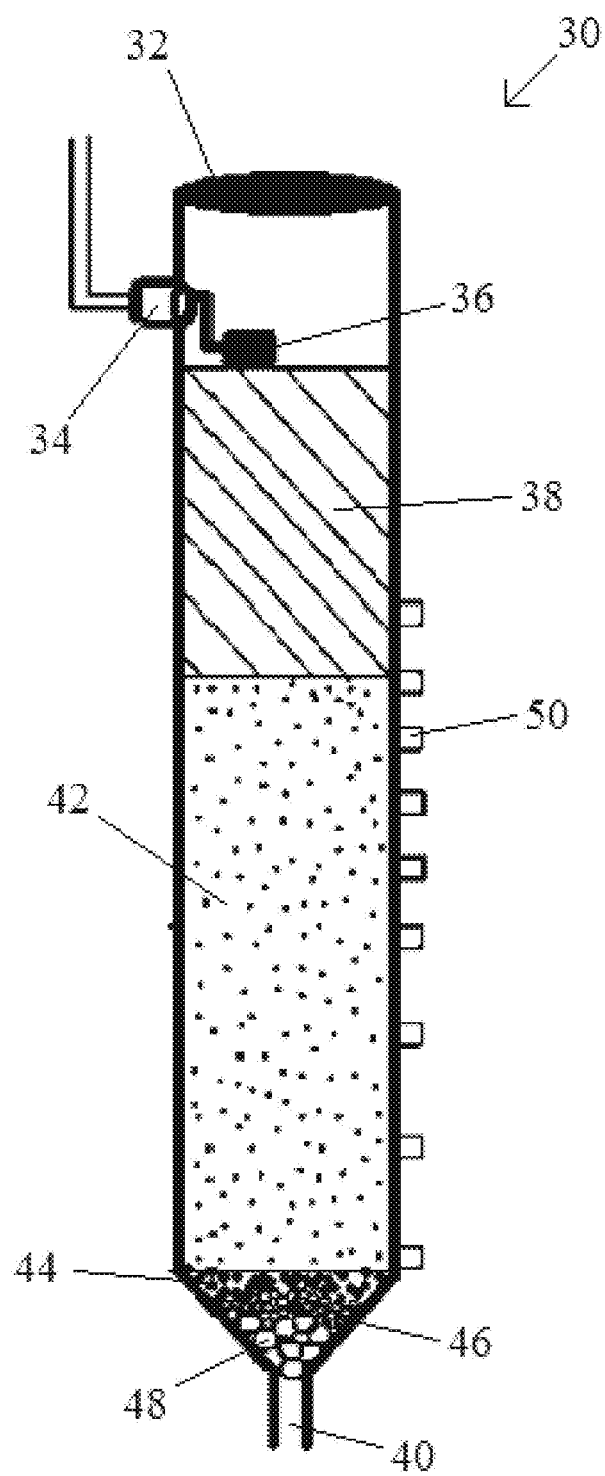
FIG. 8: Illustration of a non-limiting example of a biofilter as described herein.
Figure 9:
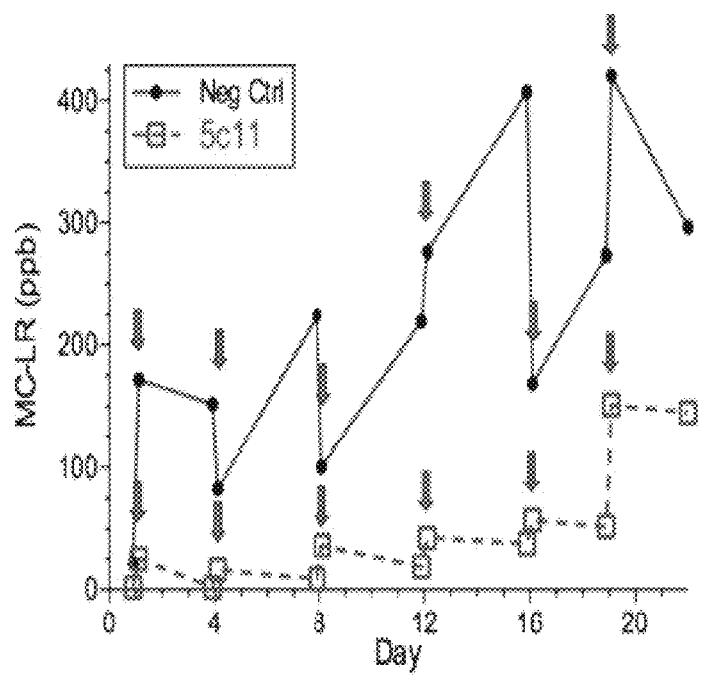
FIG. 9: Biodegradation of MC-LR and MC-RR by groups of 4-5 bacterial clones. Sample aliquots were removed before and after microcystin addition. Sterile-filtered water without any bacterial clones served as a negative control (Neg Ctrl). Microcystin levels in each sample were quantitated by mass spectrometry analysis. Bacterial group 5c11 degraded 152 ppb total MC-LR (6.9 ppb/day), group 5c12 degraded 188 ppb total MC-LR (8.5 ppb/day), and group 5c14 degraded 296 ppb total MC-LR (13.4 ppb/day). By comparison, bacterial group 5c11 did not degrade MC-RR, group 5c12 degraded 70 ppb total MC-RR (3.2 ppb/day), and group 5c14 degraded 80 ppb total MC-RR (3.6 ppb/day).
Figure 9:
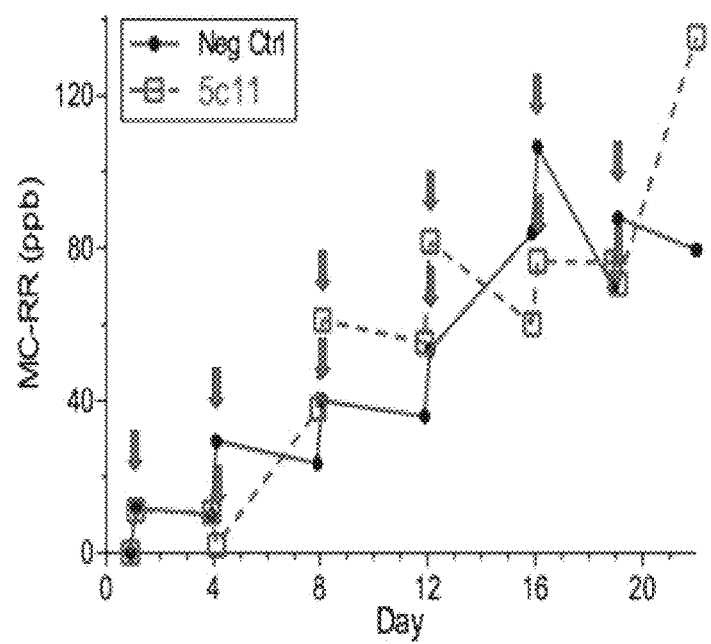
Figure 9:
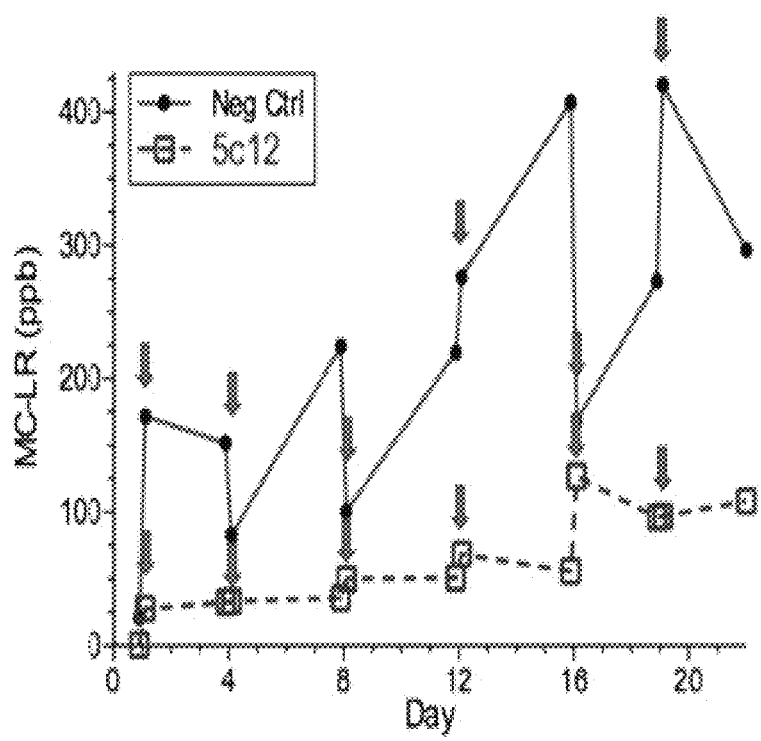
Figure 9:
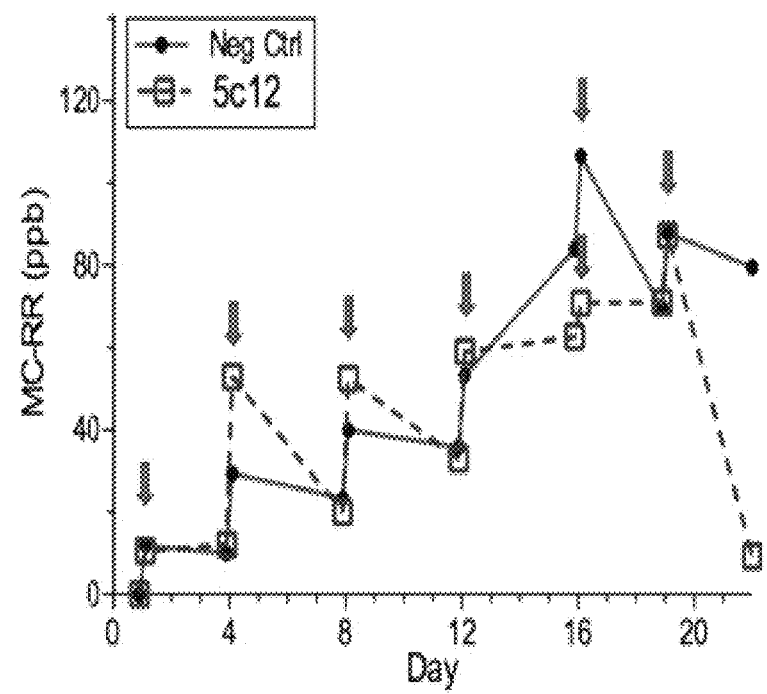
Figure 9:
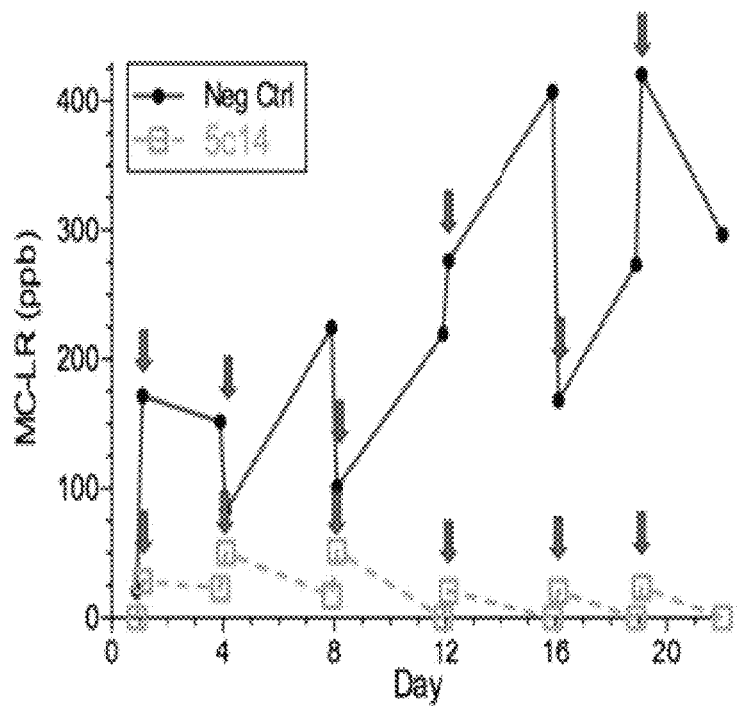
Figure 9:
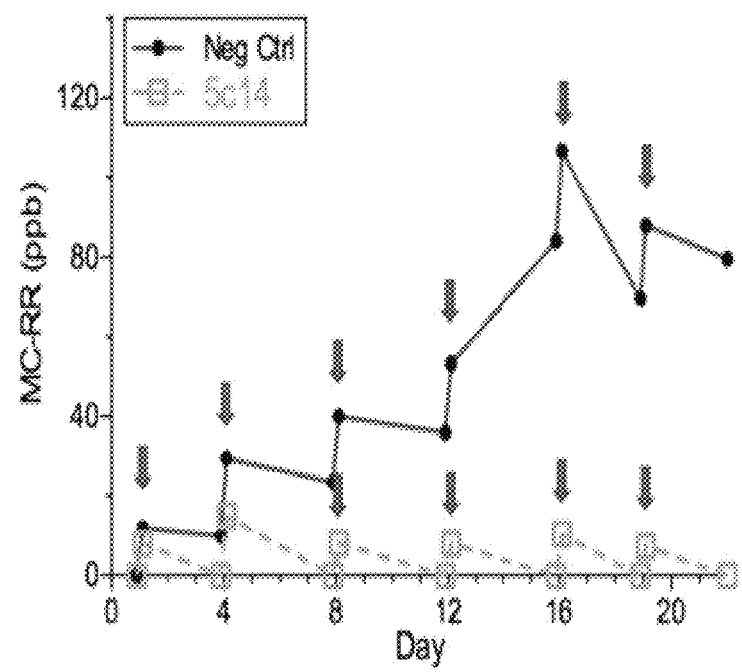

FIG. 8 illustrates another non-limiting example embodiment of a biofilter 30. Referring now to FIG. 8, the biofilter 30 may include a column 32 with an inlet 34 having a float valve 36. The column 32 includes head space 38 for water and an outlet 40 with a plurality of media 42, 44, 46, 48 packed therebetween. The first medium 42 may be fine grain sand having a size ranging from about 0.2 mm to about 0.4 mm. The second medium 44 may be sand having a size ranging from about 0.4 mm to about 0.8 mm. The third medium 46 may be smaller rockets and pebbles having a size of greater than about 0.5 cm. The fourth medium 48 may be small rocks having a size ranging from about 1 cm to about 2 cm. The media 42, 44, 46, 48 thus increase in size going down the column. Each of the media 42, 44, 46, 48 may have a biofilm formed thereon by a group of bacteria capable of degrading a microcystin compound when combined together. Alternatively, only one, only two, or only three of the media 42, 44, 46, 48 may have a biofilm formed thereon by a group of bacteria capable of degrading a microcystin compound when combined together. The biofilter 30 may further include sampling ports 50 in different locations of the column for testing at different points of the filtration process. The weight from gravity of water in the head space 38 causes water in the column 32 to flow through the media 42, 44, 46, 48, contacting the biofilm. The biofilm degrades the microcystin in the water as the water flows through the media 42, 44, 46, 48, thereby filtering microcystin out of the water. The water then exits the column 32 through the outlet 40. In one non-limiting example of the biofilter 30, the head space is about 0.3 m in vertical length of the column 32, and the combined vertical length of the first medium 42 and the second medium 44 is about 0.5 m.

It is understood that many other types of biofilters are possible and encompassed within the scope of the present disclosure.

The biofilter may be embodied in the form of a kit or kits. A non-limiting example of such a kit is a kit comprising a substrate and biologic medium comprising a biofilm formed from a group of bacteria capable of degrading a microcystin compound when combined together, where the containers may or may not be present in a combined configuration. The medium may comprise, for example, sand, gravel, polyurethane foam, peat, compost, woodchips, seashells, plastics, pumice, siliconized glass, or a combination thereof. Many other kits are possible, such as kits that comprise a medium and the group of bacteria in separate containers. The kits may further include instructions for using the components of the kit to practice the subject methods. The instructions for practicing the subject methods are generally recorded on a suitable recording medium. For example, the instructions may be present in the kits as a package insert or in the labeling of the container of the kit or components thereof. In other embodiments, the instructions are present as an electronic storage data file present on a suitable computer readable storage medium, such as a flash drive. In other embodiments, the actual instructions are not present in the kit, but means for obtaining the instructions from a remote source, such as via the internet, are provided. An example of this embodiment is a kit that includes a web address where the instructions can be viewed and/or from which the instructions can be downloaded. As with the instructions, this means for obtaining the instructions is recorded on a suitable substrate.

EXAMPLES

Isolation and Characterization of Lake Erie Bacteria that Degrade the Cyanobacterial Microcystin Toxin MC-LR Microcystin-LR (MC-LR) is a cyclic hepatotoxin produced by cyanobacteria, including *Microcystis* sp. and Planktothrix sp. Harmful algal blooms (HABs) in Lake Erie have become a major human health concern in recent years, highlighted by the August 2014 city of Toledo, Ohio municipal water "do not drink" order that affected nearly 500,000 residents for three days. Given that MC-LR contains seven amino acids (or modified amino acids), some Lake Erie bacteria degrade MC-LR for use as a nutrient source. In this example, 13 water samples were collected from various Lake Erie locations, MC-LR was continuously added to each water sample for 3 to 5 weeks to enrich for MC-LR-degrading bacteria, and MC-LR was quantitated over time. Whereas MC-LR was relatively stable in sterile-filtered lake water, robust MC-LR degradation (up to 19 ppb/day) was observed in some water samples. Following the MC-LR selection process, 66 individual bacterial clones were isolated from MC-LR degrading water samples, genotyped to exclude potential human pathogens, and MC-LR degradation by smaller groups of bacterial clones (e.g., groups of 22 clones, groups of 11 clones, etc.) or by individual clones was examined. Of the smaller groups, selected groups of 4-5 bacterial clones were found to degrade MC-LR into non-toxic forms and form robust biofilms on siliconized glass tubes. Taken together, this demonstrates the ability of isolated bacterial clones to remove MC-LR from drinking water and be used in biofilters.

Methods

Origin of Samples and MC-LR Selection Process

Sandusky Bay Water Samples

One Sandusky Bay water sample, 1163-A (N 41° 46.9, W 82° 71.5), was collected from a scum sample on Jun. 8, 2015. Other Sandusky Bay samples were collected from scum events on Jun. 29, 2015 at the following sampling locations: ODNR1 (N 41° 47.73, W 82° 73.97), ODNR2 (N 41° 47.98, W 82° 78.28), BC115 (N 41° 45, W 82° 72.9), ONDR4 (N 41° 45.73, W 82° 89.86), and ODNR6 (N 41° 45.33, W 82° 96.07). Water samples were collected approx. 6-12 inches below the water surface into autoclaved, amber, wide mouth, 1 L HDPE bottles with screw-top lids (Nalgene). Samples were stored in coolers the day of collection and transported to the laboratory at the end of the day. Water samples were stored at room temperature (approx. 21° C.) overnight and processed the following day. To remove large particulates, approx. 800 mL of each water sample was filtered through 1 μm glass microfiber filters (Whatman) into separate, sterile 2 L glass bottles with magnetic stirbars. Negative control water samples, without any viable organisms, were prepared by first pre-filtering each water sample using a 1 μm filter, then sterile-filtering each water sample using a 0.22 μm filter (Foxx Life Sciences). Because of previous reports noting that high nitrogen and phosphorus levels contribute to Lake Erie HABs, nitrogen ($NH_4Cl$ and $NaNO_3$, 5 μM each) and phosphorus ($NaH_2PO_4$, 1 μM) were added to all Sandusky Bay water samples at the beginning of the study. All water samples, both positive and negative controls, were maintained with continuous stirring (to simulate wave movement) at room temperature with 8 h:16 h light:dark cycles. MC-LR (Cayman Chemical), 50 ppb, was added to each water sample every 3-4 days for 15 days, with 1 ml aliquots collected at the beginning of the experiment (day 1) and before and after each MC-LR addition. All sample aliquots were transferred to sterile, glass 5 ml tubes, sealed with parafilm, and stored at −20° C. until use.

Ohio State University Stone Laboratory Water Sample

The August 2014 HAB that affected the city of Toledo water intake crib spread throughout other areas of Lake Erie, including the Lake Erie islands. As such, one water sample was collected near the Ohio State University Stone Laboratory on Gibraltar Island on Aug. 15, 2014. This scum sample was stored at −80° C. until use. The water sample, named hereafter as 'Stone Lab', was slowly thawed in a 4° C. cooler over the course of 48 hours and approx. 180 ml was filtered through a 1 μm filter into a sterile glass bottle with magnetic stir bar, as described above. A negative control, without any viable organisms, was prepared by sequentially filtering 50 ml of the Stone Lab water sample first through a 1 μm filter and then a 0.22 μm filter, as described above. Neither nitrogen nor phosphorus was added to either Stone Lab sample. Both samples were maintained with continuous stirring at room temperature with 8 h:16 h light:dark cycles, as described above. MC-LR, 100 ppb, was added to both Stone Lab water samples every 3-5 days for 33 days, with 1 ml aliquots being collected at the beginning of the experiment (day 1) and before and after each MC-LR addition. All sample aliquots were transferred to sterile, glass 5 ml tubes, sealed with parafilm, and stored at −20° C. until use.

Western Basin of Lake Erie Water Samples

Six scum samples were collected from the western basin of Lake Erie on Jul. 31, 2015 from the following sampling locations: GR1 (N 41° 82.078, W 83° 18.56), MB18 (N 41° 74.207, W 83° 40.16), 7M (N 41° 73.340, W 83° 29.71), 8M (N 41° 78.901, W 83° 35.56), 4P (N 41° 75.045, W 83° 10.35), and CRIB (N 41° 70.3, W 83° 26.3). GR1, MB18, 7M, 8M, and 4P collection sites were described in a previous publication. The CRIB collection site is the water intake crib for the city of Toledo, which was engulfed by a large HAB in August 2014, resulting in the Toledo water crisis. Water samples were collected approx. 6-12 inches below the water surface into autoclaved, amber, 1 L HDPE bottles with screw-top lids as described above. All western basin of Lake Erie samples were filtered, maintained, supplemented with MC-LR, and aliquots removed every 3-5 days as described above for the Sandusky Bay samples. The only exceptions were that neither nitrogen nor phosphorus were added to any western basin of Lake Erie samples and MC-LR was added every 3-5 days for approx. 4 weeks.

Quantitation of Bacterial Numbers in Water Samples

For western basin of Lake Erie water samples, aliquots were removed at the beginning of the experiment (day 1; before MC-LR addition) and approx. every 7 days during the MC-LR selection process. Aliquots were 10-fold serially diluted in PBS and dilutions plated in duplicate onto Difco R2A agar (BD). R2A media was used as it was developed to study bacteria commonly found in potable water. Plates were incubated at 23° C. for 3-4 days, colonies were counted, averaged, and CFU/ml were calculated based on the dilution factor.

Isolating Potential MC-LR Degrading Bacterial Clones

At the completion of each MC-LR selection process (21-33 days), aliquots were serially-diluted in PBS, and plated onto R2A media to isolate individual colonies. Selected dilutions were plated onto multiple R2A agar plates based on previous optical density measurements at 600 nm ($OD_{600}$), serial dilution, and bacterial enumeration studies. Plates were incubated at 23° C. for 3-4 days before recording colony phenotypes (e.g. color, size, shape, texture). Individual bacterial clones were replica plated onto fresh R2A agar plates to ensure clonality and individual bacterial clones were suspended in BG-11 growth media (Gibco) containing 15% glycerol before archiving at −80° C. for future use. A total of 66 individual bacterial clones were isolated from MC-LR degrading cultures and archived during this study (Table 1).

TABLE 1

MC-LR degrading bacterial clones isolated from Lake Erie

| Clone designation | Colony phenotype | Collection site[a] | Degradation group[b] | 16S rRNA genus and species |
|---|---|---|---|---|
| GR1 SY | Small yellow | GR1 | 22c2, 11c3, 5c4 | Acinetobacter haemolyticus |
| LW | Large white | 1163 | 22c1, 11c2, 5c1, indiv | Acinetobacter johnsonii |
| EW | Elongated white | 1163 | 22c1, 11c1, 5c6 | Acinetobacter johnsonii |
| ECW | Elongated cloudy white | 1163 | 22c1, 11c2, 5c9 | Acinetobacter johnsonii |
| CRIB SB | Small beige | CRIB | 22c3, 11c5, 5c14 | Agrobacterium albertimagni |
| 4P FEY | Foggy egg yolk | 4P | 22c3, 11c5, 5c16 | Agrobacterium albertimagni |
| SW | Small white | 1163 | 22c1, 11c2, 5c5, indiv | Agrobacterium tumefaciens |
| GR1 TC | Tiny clear | GR1 | 22c2, 11c3, 5c2 | Asticcacaulis biprosthecium |
| ODNR2 SW | Small white | ODNR2 | 22c2, 11c4, 5c9, indiv | Bacillus cereus |
| BC115 FW | Fringed white | BC115 | 22c1, 11c2, 5c15 | Bacillus cereus |
| 1163B R | Rigid | 1163 | 22c1, 11c2, 5c3, indiv | Bacillus mycoides |
| 8M D | Doughnut shape | 8M | 22c3, 11c6, 5c1 | Brevundimonas nasdae |
| SL LO | Small light orange | Stone Lab | 22c3, 11c6, 5c5, indiv | Brevundimonas subvibrioides |
| SL O | Bright orange | Stone Lab | 22c3, 11c5, 5c6, indiv | Brevundimonas subvibrioides |
| SL PL | Pale yellow | Stone Lab | 22c3, 11c6, 5c7 | Dyadobacter fermentans |
| LP | Large pink | 1163 | 22c1, 11c2, 5c7 | Emticicia oligotrophica |
| GR1 MO | Medium orange | GR1 | 22c2, 11c3, 5c16 | Emticicia sediminis |
| BC115 SY | Small yellow | BC115 | 22c2, 11c4, 5c7 | Flavobacterium akiainvivens |
| MB18 LPC | Large peaches & cream | MB18 | 22c2, 11c4, 5c5, indiv | Flectobacillus major |
| MB18 GO | Gooey orange | MB18 | 22c2, 11c3, 5c6, indiv | Flectobacillus major |
| ODNR4 P | Pink | ODNR4 | 22c1, 11c2, 5c11 | Flectobacillus roseus |
| GR1 GP | Giant pink foggy | GR1 | 22c2, 11c4, 5c1, indiv | Flectobacillus major |
| BC115 SP | Small pink | BC115 | 22c1, 11c1, 5c14, indiv | Flectobacillus sp. |
| ODNR2 LW | Large white | ODNR2 | 22c1, 11c1, 5c2, indiv | Gemmobacter sp. |
| CRIB BY | Small bright yellow | CRIB | 22c3, 11c5, 5c10, indiv | Hydrogenophage intermedia |
| CRIB TY | Tiny yellow | CRIB | 22c3, 11c5, 5c16, indiv | Hydrogenophage intermedia |
| MB18 THP2 | Medium white | MB18 | 22c3, 11c6, 5c9 | Ideonella paludis |
| CRIB PO | Pale orange | CRIB | 22c3, 11c6, 5c11 | Leadbetterella byssophila |
| GR1 FE | Fried egg shape | GR1 | 22c2, 11c4, 5c4 | Microbacterium hominis |
| 8M SHP | Small hot pink | 8M | 22c3, 11c5, 5c2 | Microbacterium proteolyticum |
| CRIB LY | Large yellow | CRIB | 22c3, 11c6, 5c13 | Microbacterium testaceum |
| GR1 MY | Medium yellow | GR1 | 22c2, 11c3, 5c1, indiv | Microbacterium trichothecenolyticum |
| 4PMYR | Medium yellow | 4P | 22c3, 11c6, 5c13 | Microbacterium trichothecenolyticum |
| 8M SYR | Small yellow | 8M | 22c3, 11c6, 5c3 | Microbacterium trichothecenolyticum |
| LY | Large yellow | 1163 | 22c1, 11c1, 5c2, indiv | Novosphingobium aromaticivorans |
| GR1 GB | Giant Beige | GR1 | 22c2, 11c4, 5c15, indiv | Novosphingobium resinovorum |
| SL TP | Tiny pink | Stone Lab | 22c3, 11c5, 5c14 | Porphyrobacter sp. |
| GR1 FB | Fringed beige | GR1 | 22c2, 11c4, 5c3, indiv | Pseudomonas alcaligenes |
| ODNR6 LW | Large white | ODNR6 | 22c1, 11c1, 5c10 | Pseudomonas alkylphenolia |
| 1163B LW | Large white | 1163 | 22c1, 11c2, 5c13, indiv | Pseudomonas fluorescens |
| ODNR1 D | Doughnut shape | ODNR1 | 22c2, 11c3, 5c8 | Pseudomonas fluorescens |
| BC115 Clo | Cloudy white | BC115 | 22c2, 11c4, 5c13 | Pseudomonas fluorescens |
| BC115 LW | Large white | BC115 | 22c1, 11c1, 5c14 | Pseudomonas migulae |
| ODNR4 J | Pink jelly | ODNR4 | 22c1, 11c2, 5c15, indiv | Pseudomonas hunanensis |
| ODNR6 Y | Yellow | ODNR6 | 22c1, 11c1, 5c16, indiv | Pseudomonas hunanensis |
| ODNR4 SY | Small yellow | ODNR4 | 22c2, 11c4, 5c11 | Pseudomonas hunanensis |
| SL TY | Tiny yellow | Stone Lab | 22c3, 11c5, 5c12 | Pseudomonas sp. [CC15M4] |
| SL FW | Foggy white | Stone Lab | 22c3, 11c6, 5c11 | Pseudomonas abietaniphila |
| ODNR4 LW | Large white | ODNR4 | 22c1, 11c1, 5c4 | Pseudomonas plecoglossicida |
| ODNR1 LW | Large white | ODNR1 | 22c1, 11c1, 5c12, indiv | Pseudomonas putida |
| 1163B MW | Milky white | 1163 | 22c2, 11c3, 5c6 | Pseudomonas putida |
| MB18 MS | Medium scarlet | MB18 | 22c2, 11c4, 5c7, indiv | Pseudomonas putida |
| CW | Cloudy white | 1163 | 22c1, 11c1, 5c4, indiv | Pseudomonas rhizosphaerae |
| ODNR6 D | Doughnut shape | ODNR6 | 22c2, 11c4, 5c5 | Pseudomonas salomonii |
| ODNR2 SY | Small yellow | ODNR2 | 22c2, 11c3, 5c10, indiv | Rhizobium selenitireducens |
| ODNR1 SW | Small white | ODNR1 | 22c1, 11c2, 5c1 | Rhizobium sp. |
| MB18 THP1 | Tiny hot pink | MB18 | 22c2, 11c3, 5c8 | Runella slithyformis |
| CRIB TP | Tiny Pink | CRIB | 22c3, 11c6, 5c15 | Runella slithyformis |
| CRIB MP | Medium pink | CRIB | 22c3, 11c5, 5c12 | Runella sp. [THWCSN44] |
| SL W | White round | Stone Lab | 22c3, 11c6, 5c9 | Shinella sp. |
| SY | Small yellow | 1163 | 22c1, 11c1, 5c8, indiv | Sphingobium xenophagum |
| ODNR6 Cl | Clumpy clear | ODNR6 | 22c2, 11c3, 5c12 | Sphingobium yanoikuyae |
| D | Doughnut shape | 1163 | 22c1, 11c2, 5c3 | Sphingobium yanoikuyae |
| 1163B D | Clear donut-shaped | 1163 | 22c2, 11c3, 5c14 | Sphingobium yanoikuyae |

TABLE 1-continued

MC-LR degrading bacterial clones isolated from Lake Erie

| Clone designation | Colony phenotype | Collection site[a] | Degradation group[b] | 16S rRNA genus and species |
|---|---|---|---|---|
| SL G | Foggy White | Stone Lab | 22c3, 11c5, 5c8 | *Variovorax paradoxus* |
| SL LB | Lumpy beige | Stone Lab | 22c3, 11c5, 5c10 | *Variovorax paradoxus* |

[a]See FIG. 1A for collection site locations in Lake Erie.
[b]'22c' indicates 22 clones/group, '11c' indicate 11 clones/group, '5c' indicates 4-5 clones/group, and 'indiv' indicates clones that were individually tested Testing MC-LR Degradation by Randomly-Assorted Bacterial Clones Each of the 66 MC-LR degrading bacterial clones were randomly assigned to the following groups to assess MC-LR degradation: 3 groups of 22 bacterial clones per group; 6 groups of 11 bacterial clones per group; 16 groups with 4-5 bacterial clones per group; and 25 individual bacterial clones (Table 1). Bacterial clones were individually plated onto R2A agar, incubated at 23° C. for 3-4 days, bacteria were suspended in 0.22 µm-filtered lake water to approx. the same $OD_{600}$, and equal volumes of each bacterial suspension were inoculated into 50 ml conical tubes containing 30 mL of 0.22 µm-filtered lake water, with foam Identi-Plugs (Jaece) at the top of each tube to allow for air exchange. The starting $OD_{600}$ for each culture was approx. 0.1, cultures were incubated at 23° C., with constant rotation at 215 rpm, and cultures were maintained on 12 h:12 h light:dark cycles using a grow light (BloomBoss). A 0.5 mL aliquot was removed from each culture at the beginning of the experiment (day 1), approx. 45 ppb MC-LR was added to each culture every 3-5 days, samples were collected both before and after MC-LR addition, and MC-LR levels were quantitated for 12 days. Negative controls consisted of 30 mL of sterile-filtered lake water without bacterial inoculation. All culture aliquots were transferred to sterile glass 5 ml tubes, sealed with parafilm, and stored at −20° C. until use.

Lake water for sterile-filtration (0.22 µm) was collected during non-bloom months (April, May, October, December), collected at least 4 days after any local rain event to minimize nutrient loading from tributaries, harvested from either Nickel Plate Beach in Huron, Ohio (N 41° 39.64, W 82° 54.36) or Metzger Marsh in Curtice, Ohio (N 41° 64.08, W 83° 24.66), frozen at −20° C. until use, 0.22 µm-filtered as described above, and stored at 4° C. for experimental use.

Biofilm Assessments

Selected bacterial clones were plated onto R2A agar plates, incubated at 23° C. for 3-4 days, bacteria were suspended in 0.22 µm-filtered lake water, the $OD_{600}$ was adjusted to approx. 0.1 for all cultures, and 8 ml of each bacterial suspension was added to sterile 14 mL silica glass tubes (with foam plugs to allow for air exchange). Cultures were incubated at 23° C., with constant rotation at 215 rpm, and maintained on 12 h:12 h light:dark cycles using a grow light. Negative controls consisted of 8 mL of sterile-filtered lake water without bacterial inoculation. All biofilm cultures were set-up in triplicate and incubated for four weeks. Once per week, 2 mL from each culture was removed and replaced with 2 mL of fresh 0.22 µm sterile-filtered lake water. After four weeks of incubation, all liquid was carefully removed from each tube, tubes were gently washed three times with 3 mL of PBS, 3 mL of 100% methanol was added to each tube, tubes were incubated for 15 minutes, methanol was carefully removed, and tubes were air-dried for 30 minutes. Each tube was stained with 5 mL of staining solution (1% wt/vol crystal violet and 25% vol/vol ethanol) for 15 minutes, the staining solution was removed, tubes were gently rinsed with 5 mL of deionized water, and tubes were air-dried overnight. The following day, 5 mL of 33% glacial acetic acid was added to each tube, incubated for 15 minutes, and biofilm formation was quantitated by $OD_{570}$ measurements.

16S rRNA Genotyping of Potential MC-LR Degrading Bacteria

Individual bacterial clones were plated onto R2A agar plates, incubated at 23° C. for 3-4 days, and DNA was extracted from each clone using either TRIzol reagent (Invitrogen), following manufacturer's instructions, or phenol:chloroform. PCR amplification was performed using GoTaq Green Master Mix (Promega), 125 ng of bacterial clone DNA, and 16S rRNA prim

```
8F                                    (SEQ ID NO: 1)
(5'-AGAGTTTGATCCTGGCTCAG-3')
``` and

```
1492R                                 (SEQ ID NO: 2)
(5'-GGTTACCTTGTTACGACTT-3').
```

PCR amplification conditions were as follows: 95° C. for 2 minutes; followed by 40 cycles of 95° C. for 30 seconds, 40° C. for 30 seconds, and 72° C. for 60 seconds; 72° C. for 7 minutes; and a final hold at 4° C. All PCR reactions were separated on 1% agarose gels and visualized to confirm correct product size (approx. 1400 bp). PCR products were purified using the Qiaquick PCR cleanup kit (Qiagen), following the manufacturer's instructions, DNA concentration was quantitated using a Nanodrop (Thermo Scientific), and DNA sequencing was performed (Eurofins) using both forward and reverse 16S rRNA primer pairs. All sequencing results were queried using BLASTn analysis to the GenBank databank.

Retesting MC-LR Degradation by Selected Groups of Bacterial Clones

Based on preliminary MC-LR degradation results, three groups of bacterial clones (5c11, 5c12, and 5c14), each consisting of 4-5 clones each (Table 1), were selected for further analysis. Individual bacterial clones were plated onto R2A agar plates, incubated at 23° C. for 3-4 days, and one loopful of each bacterial clone was inoculated into 70 mL of 0.22 µm-filtered lake water, with the starting $OD_{600}$ adjusted to 0.1. An aliquot was collected from each flask at the beginning of the experiment (day 1), approx. 16 ppb MC-LR was added to each flask every 3-5 days, aliquots were collected both before and after each MC-LR addition, flasks were incubated at 23° C. with constant rotation at 215 rpm, flasks were maintained with 12 h:12 h light:dark cycles using a grow light, and all cultures were incubated for 16 days. All culture aliquots were transferred to sterile glass 5 mL tubes, sealed with parafilm, and stored at −20° C. until use.

MC-LR Quantitation by ELISA

MC-LR was quantitated using the Abraxis Microcysins and Nodularins ELISA. All samples were processed following the Ohio EPA Total (Extracellular and Intracellular) Microcystins-ADDA by ELISA, Analytical Methodology (version 2.0, January 2015). Briefly, all samples were subjected to three rapid freeze-boil cycles (using a dry-ice/ethanol bath and boiling water bath), filtered using 0.7 µm glass fiber syringe filters (Environmental Express), and stored in sterile 5 mL silica glass tubes. Processed samples were diluted in molecular grade water (Corning), based on predicted MC-LR concentrations, so that the final MC-LR concentration in each sample was theoretically within the range of standards supplied in the Microcysins and Nodularins ELISA kit. ELISA plates were analyzed using a plate reader (FLUOstar Omega) and MC-LR concentrations were calculated following the manufacturer's instructions.

MC-LR Quantitation by Mass Spectrometry

Samples were analyzed using a Thermo Scientific TSQ Quantiva™ triple quadrupole mass spectrometer with UltiMate™ 3000 ultra high performance liquid chromatography (UPLC). Using electrospray ionization (ESI) positive mode in selective reaction monitoring (SRM) and single ion monitoring (SIM) modes, analytes were separated using a Thermo Hypersil Gold column (2.1×50 mm, 1.9 µm particle size), at a flow of 0.35 mL/min using a binary gradient. Mobile phase A consisted of 0.1% formic acid in water and mobile phase B consisted of 0.1% formic acid in acetonitrile. The gradient started with mobile phase B held at 35% from 0-1 min, and increased from 35 to 60% mobile phase B from 1-4.75 min. The column was then washed from 4.76-6.5 min at 98% mobile phase B and then allowed to equilibrate back to 35% mobile phase B from 6.51-9.5 min. Injection volume was 10 µL for quantitative results in SRM mode, 20 µL for SIM, and the column oven was kept at a constant temperature of 35° C. Source settings were as follows: ion voltage 3.5 kV, ion transfer tube temperature at 260° C., vaporizer temperature at 375° C., sheath gas at 25 arbitrary units, auxiliary gas at 15 arbitrary units, and sweep gas at 1 arbitrary unit.

PCR Detection of mlrABC Genes in MC-LR Degrading Bacterial Clones

Individual bacterial clones were plated onto R2A agar plates, incubated at 23° C. for 3-4 days, and DNA was extracted from each clone using standard phenol:chloroform extraction procedures. PCR amplification of mlrA, mlrB, or mlrC was performed using GoTaq Green Master Mix, 125 ng of bacterial clone DNA, and each of the following primer pairs:

```
nalrA F1                          (SEQ ID NO: 3)
(5'-GACCCGATGTTCAAGATGCT-3')
```
and
```
mlrA R3                           (SEQ ID NO: 4)
(5'-CTCCTCCCACAAATCAGGAC-3');
```
and
```
nalrB F1                          (SEQ ID NO: 5)
(5'-ATCCGCACCTATCTGCCTGAC-3')
```
and
```
nalrB R2                          (SEQ ID NO: 6)
(5'-GTCGCCATAGCCTTGCCAG-3');
```
or
```
narC F1                           (SEQ ID NO: 7)
(5'-GCTTGATCGTCGAACATTGATGG-3')
```
and
```
mliC R2                           (SEQ ID NO: 8)
(5'-CGGCATGGCGAAGGCAC-3').
```

Sphingomonas sp. ACM3962 was used as a positive control, as it has been demonstrated to contain all three m1r genes. PCR conditions were as follows: 95° C. for 120 seconds; followed by 30 cycles of 95° C. for 30 seconds, 53° C. for 30 seconds (for mlrA; 61° C. for m1rBC), and 72° C. for 60 seconds; 72° C. for 7 minutes; and a final hold at 4° C. All PCR reactions were separated on 0.8 to 1% agarose gels and visualized to confirm correct product size (800 bp for mlrA, 400 bp for mlrB, 300 bp for mlrC). Agarose gels were imaged using a Mega Ultra Lum gel imager. Any incorrectly-sized amplicons (e.g. clone ODNR1 LW amplified a product using the mlrC primers) were purified using the QIAquick PCR cleanup kit, DNA concentration was quantitated using a Nanodrop, and bidirectional DNA sequencing was performed (Eurofins) using the respective primer pair.

Results

Selection of MC-LR Degrading Bacteria from Lake Erie Water Samples

Figure 1B:
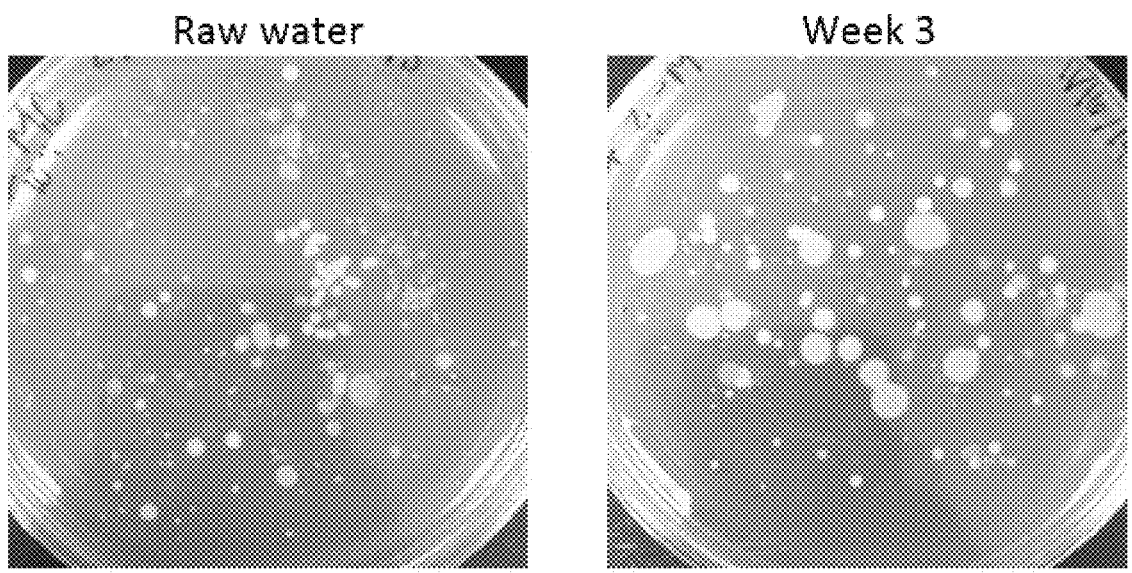
Figure 1C:
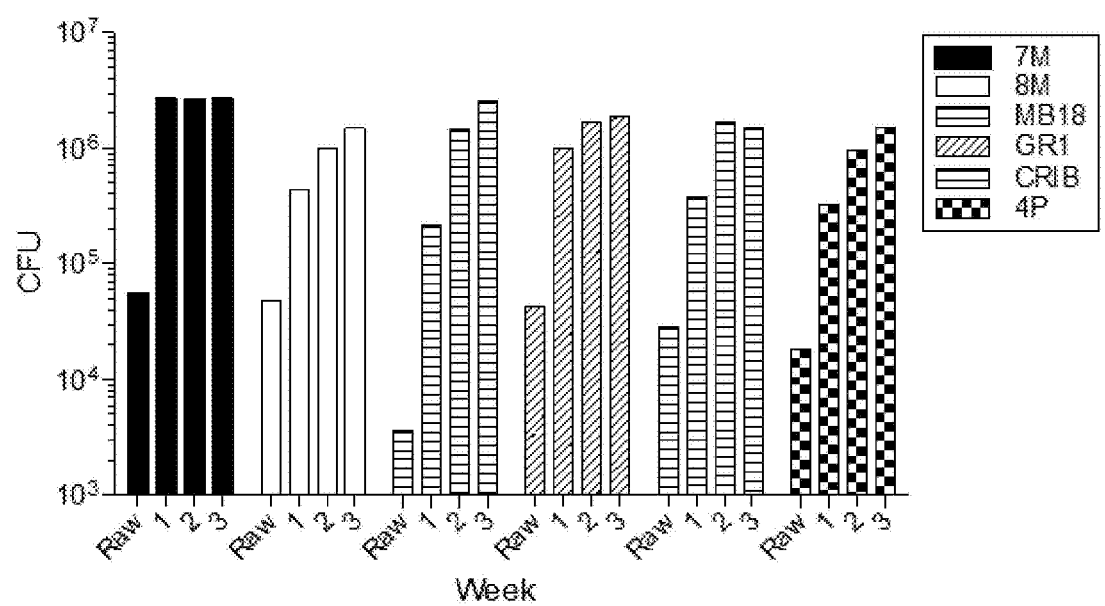
Figure 1D:
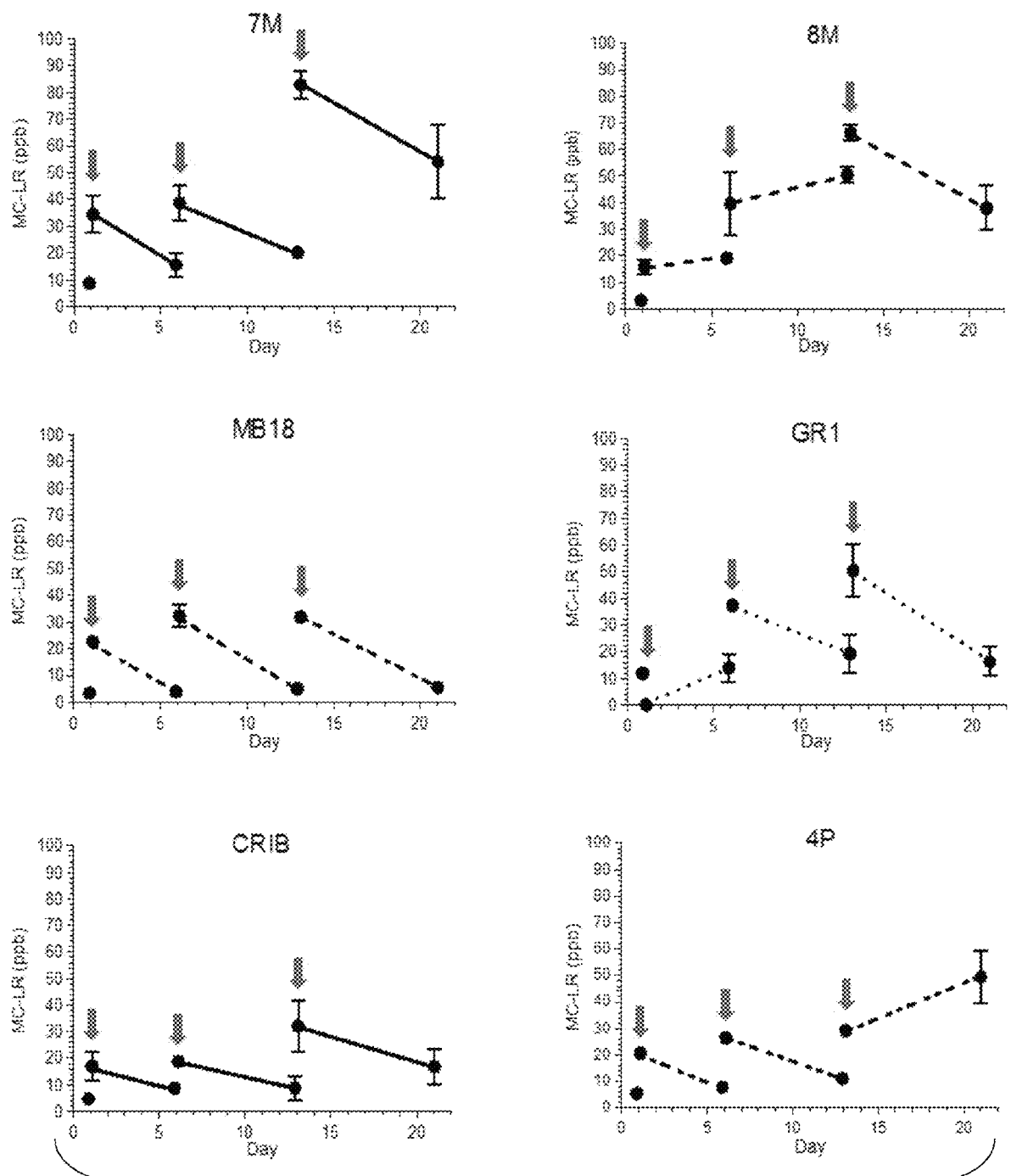

To enrich for and isolate MC-LR degrading bacteria from Lake Erie, 13 water samples were collected from scum events at various locations throughout the western basin of Lake Erie, including Sandusky Bay, during the summers of 2014 and 2015 (FIG. 1A). In the laboratory, samples were pre-filtered to remove large particulates, then MC-LR was added every 3-5 days for approx. three weeks to select for bacteria that could use MC-LR as a source of nutrients. Focusing on samples collected from the western basin of Lake Erie, selection was assessed three different ways. First, colony morphologies were compared at the beginning and end of the experiment based on the belief that the MC-LR selection process would result in phenotypic changes in the bacterial population. Whereas primarily small, white colonies were observed from raw lake water, a diverse array of colony sizes, colors, and shapes were apparent after three weeks of incubation with MC-LR (FIG. 1B), indicating a change in the bacterial population during three weeks of MC-LR exposure. Second, bacterial numbers were quantitated once per week during MC-LR incubation based on the hypothesis that bacteria which could use MC-LR as a source of nutrients would proliferate/increase in numbers but bacteria which could not use MC-LR as a nutrient source during the three week selection process would decrease in numbers and/or die. A 1.6- to 2.8-log increase in bacterial numbers was observed in all Lake Erie water samples when comparing the raw lake water sample with samples collected after three weeks of MC-LR incubation (FIG. 1C), providing evidence that bacteria could use MC-LR as an energy source. The diverse sampling locations around the western basin of Lake Erie (FIG. 1A) were reflected by the diverse replication rates of bacteria continuously exposed to MC-LR for three weeks including: sample 7M demonstrated rapid (1.7-log) bacterial replication between the raw lake water sample and week 1 of MC-LR incubation but no additional bacterial replication during subsequent weeks; sample MB18 demonstrated continuous bacterial replication during three weeks of MC-LR incubation, with a 2.8-log total increase in bacterial numbers by week 3 (FIG. 1C). Finally, MC-LR levels were quantitated before and after each MC-LR addition (3 total additions). Because all samples were harvested from HAB events, each sample contained 3.2-11.9 ppb MC-LR at the beginning (day 1) of the experiment (FIG. 1D). Despite adding 150 ppb total MC-LR to each water sample over the course of 21 days, the final MC-LR concentration in each sample was between 5.6-54.1 ppb, indicating 95.9-144.4 ppb total MC-LR degradation or 4.6-6.9 ppb/day average daily degradation. Interestingly, samples 7M, MB18, and CRIB continuously degraded MC-LR, while samples 8M and GR1 required an adaptation period (13 days for 8M; 6 days for GR1) before MC-LR degradation was observed. Finally, sample 4P degraded MC-LR after each of the first two MC-LR additions but did not degrade MC-LR following the final MC-LR addition. MC-LR degradation also was observed in Sandusky Bay water samples, with similar variations in degradation rates among collection sites.

Figure 2:
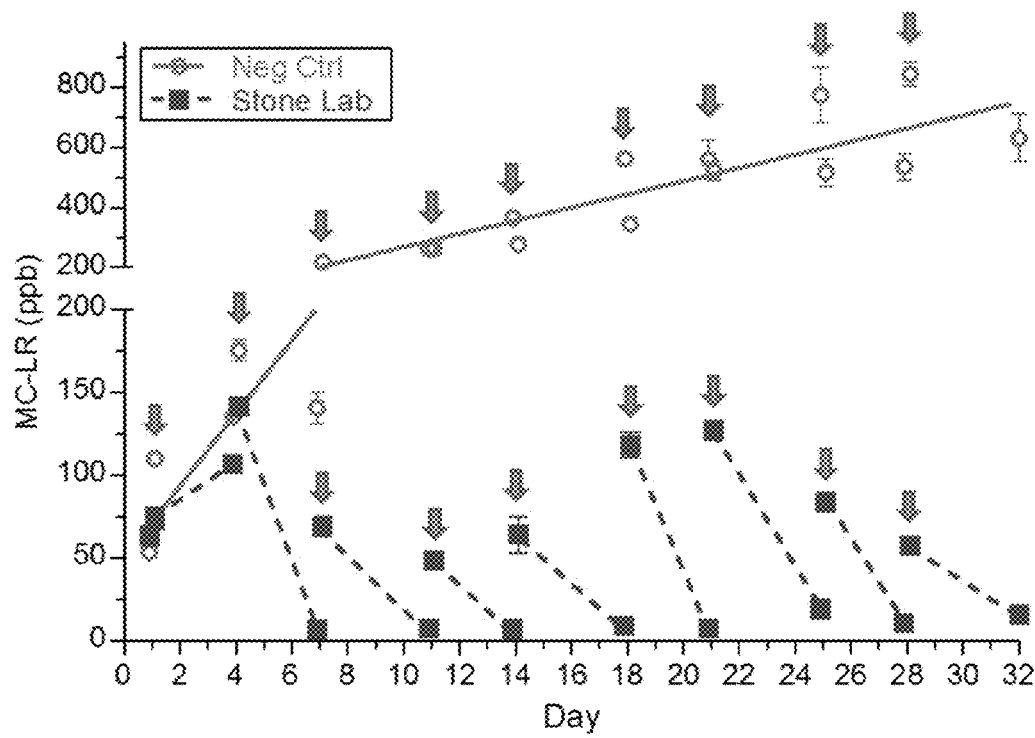
FIG. 2: Stone Lab water sample continuously and robustly degrades MC-LR. A water sample was collected from a scum event near the Ohio State University Stone Laboratory on Gibraltar Island (see FIG. 1A for location) in August 2014. The water sample was pre-filtered using a 1 μm filter, incubated at 20-22° C. with continuous stirring and 8 h-16 h light-dark cycles, and approx. 70 ppb MC-LR added every 3-4 days (indicated by blue arrows) for 32 days. Aliquots were harvested before and after MC-LR addition and MC-LR concentrations were quantitated by ADDA ELISA. A negative control water sample (Neg Ctrl) was sterile-filtered and incubated identical to the Stone Lab sample. The solid grey line is a linear regression analysis of quantitated MC-LR in the Neg Ctrl. The dashed red line indicates quantitated MC-LR levels immediately after each MC-LR addition and 3-4 days later.

Based on the encouraging MC-LR degradation data above, the Stone Lab sample (FIG. 1A) was randomly selected for a more thorough and long-term analysis of MC-LR degradation, where approx. 70 ppb MC-LR was added every 3-4 days and MC-LR degradation was assessed for 32 days (9 total MC-LR additions). To assess whether hydrolytic enzymes were present in the original sample that could abiotically degrade MC-LR, an aliquot of the Stone Lab water sample was sterile-filtered (0.22 µm) and equal amounts of MC-LR were added to this control sample according to the same schedule. For the negative control sample, MC-LR levels generally increased during the experiment, with 632 ppb MC-LR quantitated on day 32 (FIG. 2). Increasing MC-LR concentrations in the negative control sample during the experiment indicated that MC-LR was relatively stable during this 32-day experiment and under the culturing conditions, and any changes in MC-LR concentrations in parallel cultures likely would be due to bacterial degradation. In contrast, 16 ppb MC-LR was detected in the Stone Lab water sample on day 32, indicating 616 ppb total MC-LR degradation and 19 ppb/day average degradation (FIG. 2). Similar to the 8M and GR1 samples (FIG. 1D), the Stone Lab sample appeared to undergo a 4-day adaptation period before MC-LR degradation began (FIG. 2). However, from day 5 onward, the Stone Lab sample consistently degraded MC-LR to almost undetectable levels every 3-4 days (FIG. 2). Taken together, changes in colony morphologies, increases in bacterial numbers, and dramatic reductions in MC-LR concentrations strongly indicated that 3-4 weeks of continuous incubation with MC-LR resulted in the selection of MC-LR degrading bacteria from Lake Erie.

Randomized Groups of Bacterial Clones Degrade MC-LR

To more closely examine bacterial diversity in MC-LR degrading water samples, individual bacterial clones were genotyped by 16S rRNA gene sequencing. Because it was impractical to isolate and archive all bacterial clones from all 13 water samples, between 3-13 bacterial clones from each water sample were instead selected, primarily based on differences in colony morphology among samples. In total, 66 bacterial clones were isolated and archived (Table 1). DNA sequence analysis of the 16S rRNA gene from each of the 66 clones revealed 42 distinct genus-species, with 13 genus-species being represented more than once (i.e. differences in subspecies or strain could not be determined based on 16S rRNA sequence alone; Table 1). A total of 12 different families (Moraxellaceae, Rhizobiaceae, Caulobacteriaceae, Bacillaceae, Cytophagaceae, Flexibacteriaceae, Flavobacteriaceae, Rhodobacteraceae, Comanonadaceae, Microbacteriaceae, Sphingomonadaceae, Pseudomonadaceae) were represented in the archived clones, highlighting that a wide variety of potential MC-LR degrading bacterial clones were selected for and isolated (Table 1). For safety considerations in future biodegradation studies, 16S rRNA genotyping also allowed for any potential human pathogens to be identified and excluded. Only two of the bacterial isolates are associated with human disease. One, *Microbacterium trichothecenolyticum*, was noted to be rarely isolated from catheter infections in leukemia patients. A second, *Novosphingobium aromaticivorans*, produces metabolites that are associated with primary biliary cholangitis but the etiological agent of this autoimmune liver disease still is unknown.

Figure 3A:
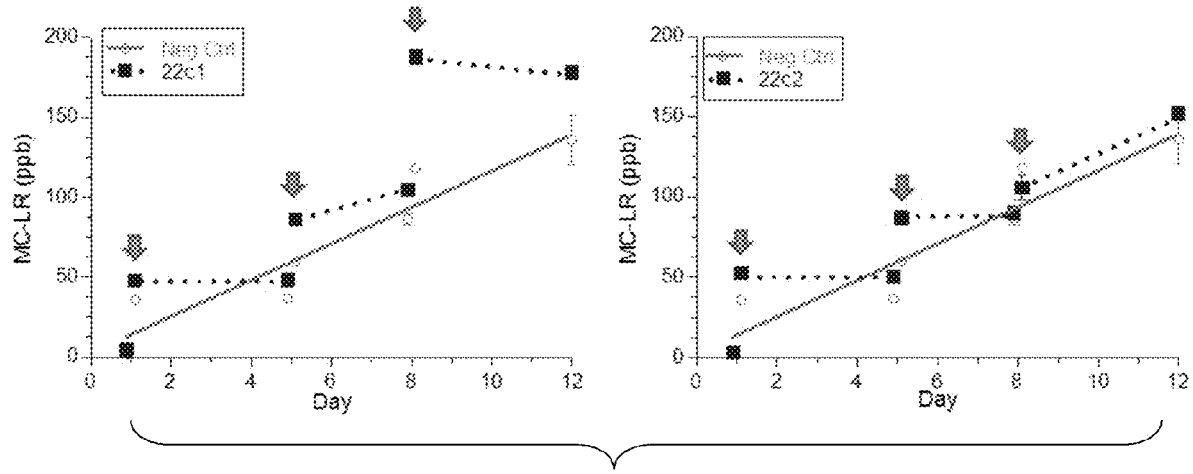
FIGS. 3A-3F: Randomly assorted groups of bacterial clones and individual clones degrade MC-LR. Sterile-filtered lake water was either not inoculated (Neg Ctrl) or inoculated with bacterial clones, incubated for 12 days at 20-22° C. with continuous stirring and 8 h:16 h light:dark cycles, and 50 ppb MC-LR added (indicated by blue arrows) to each culture on the designated days.
Figure 3B:
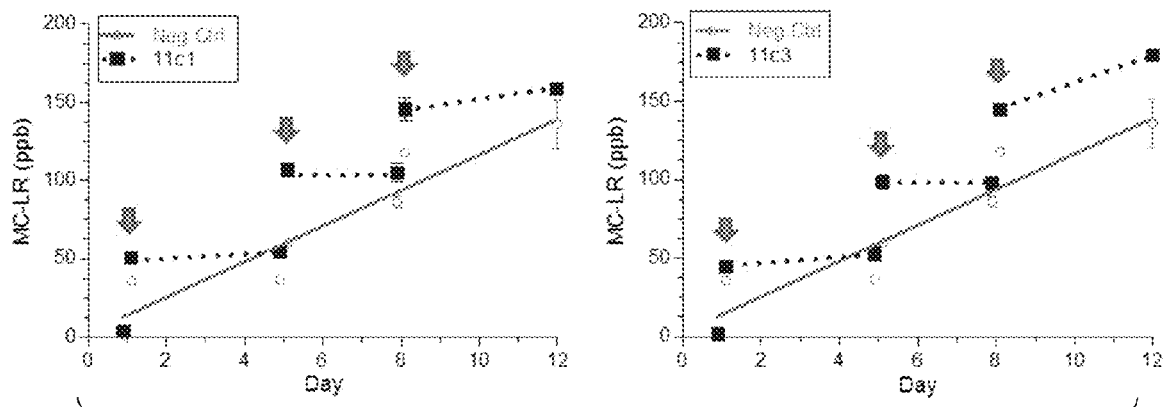
Figure 3C:
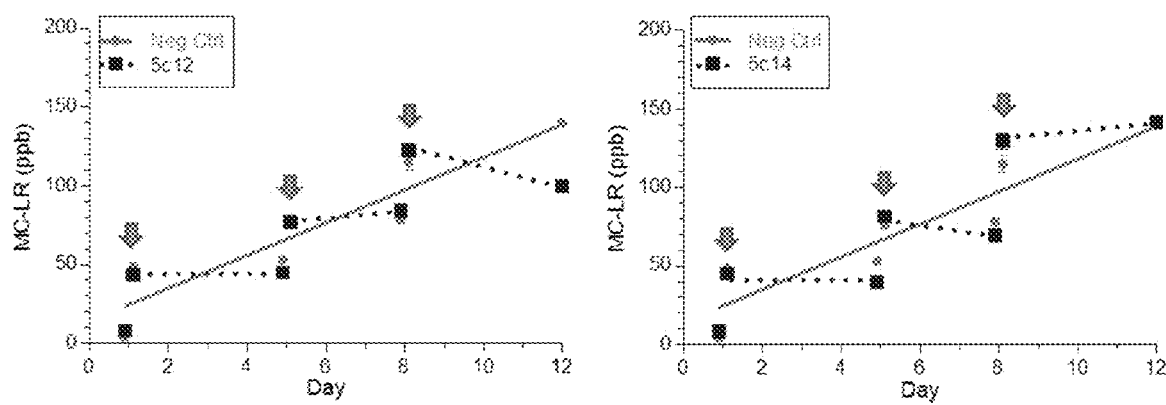
Figure 3D:
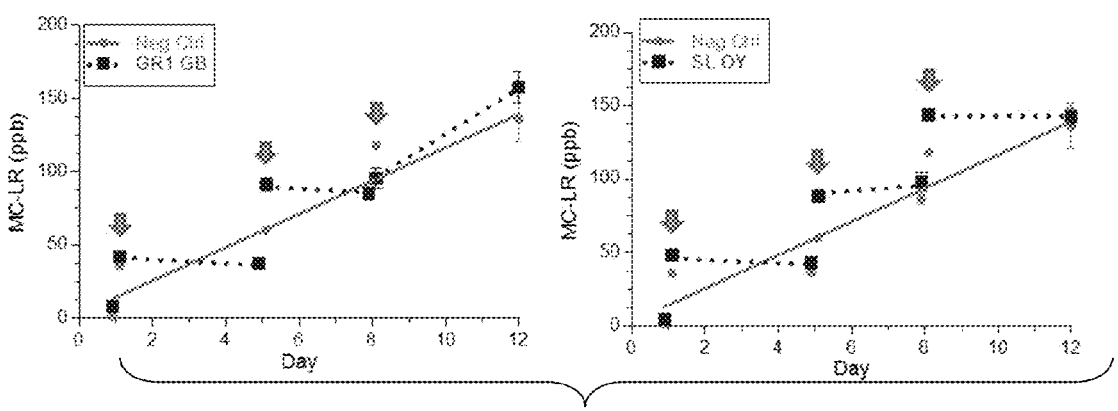
Figure 3E:
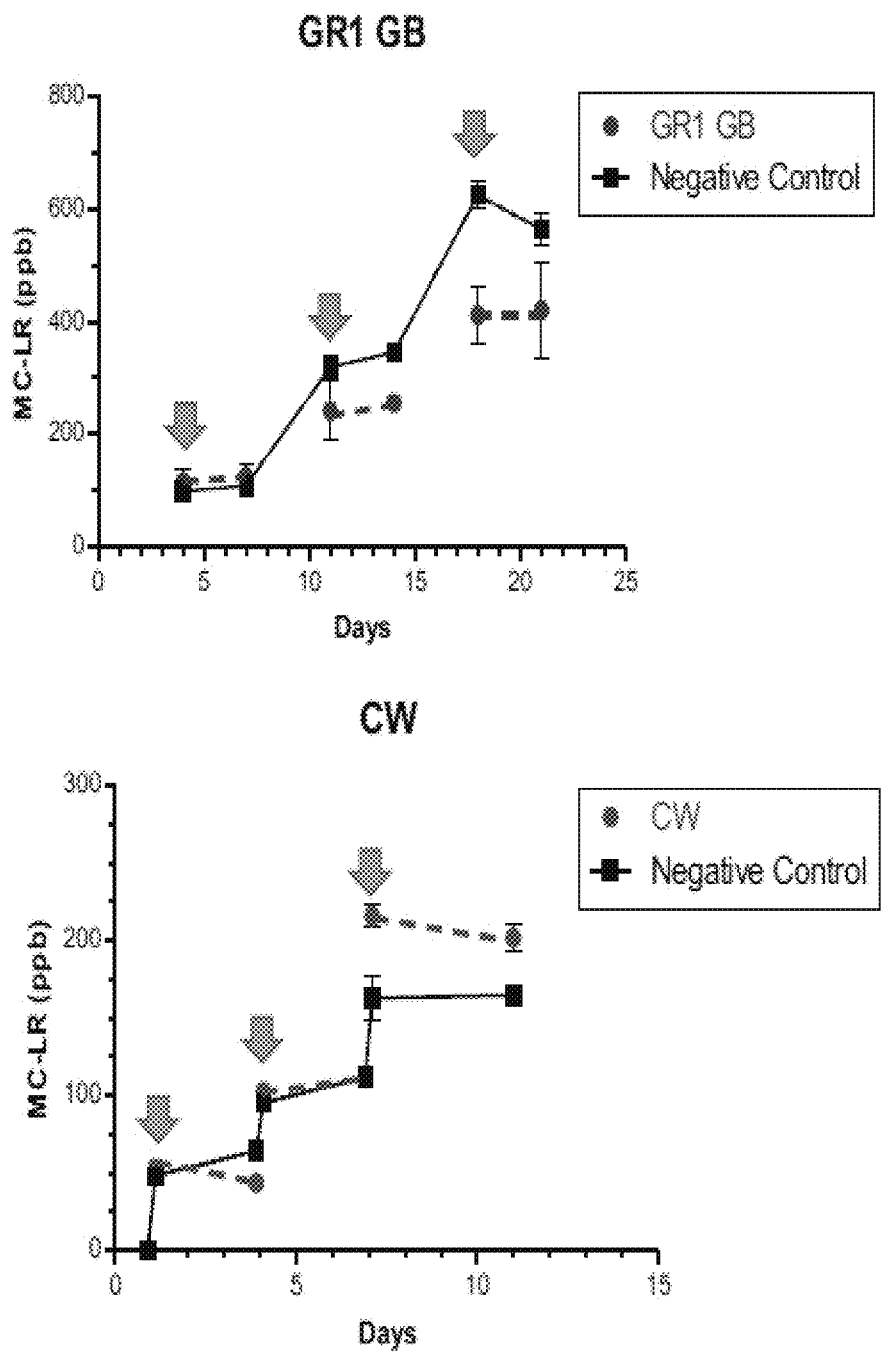
Figure 3E:
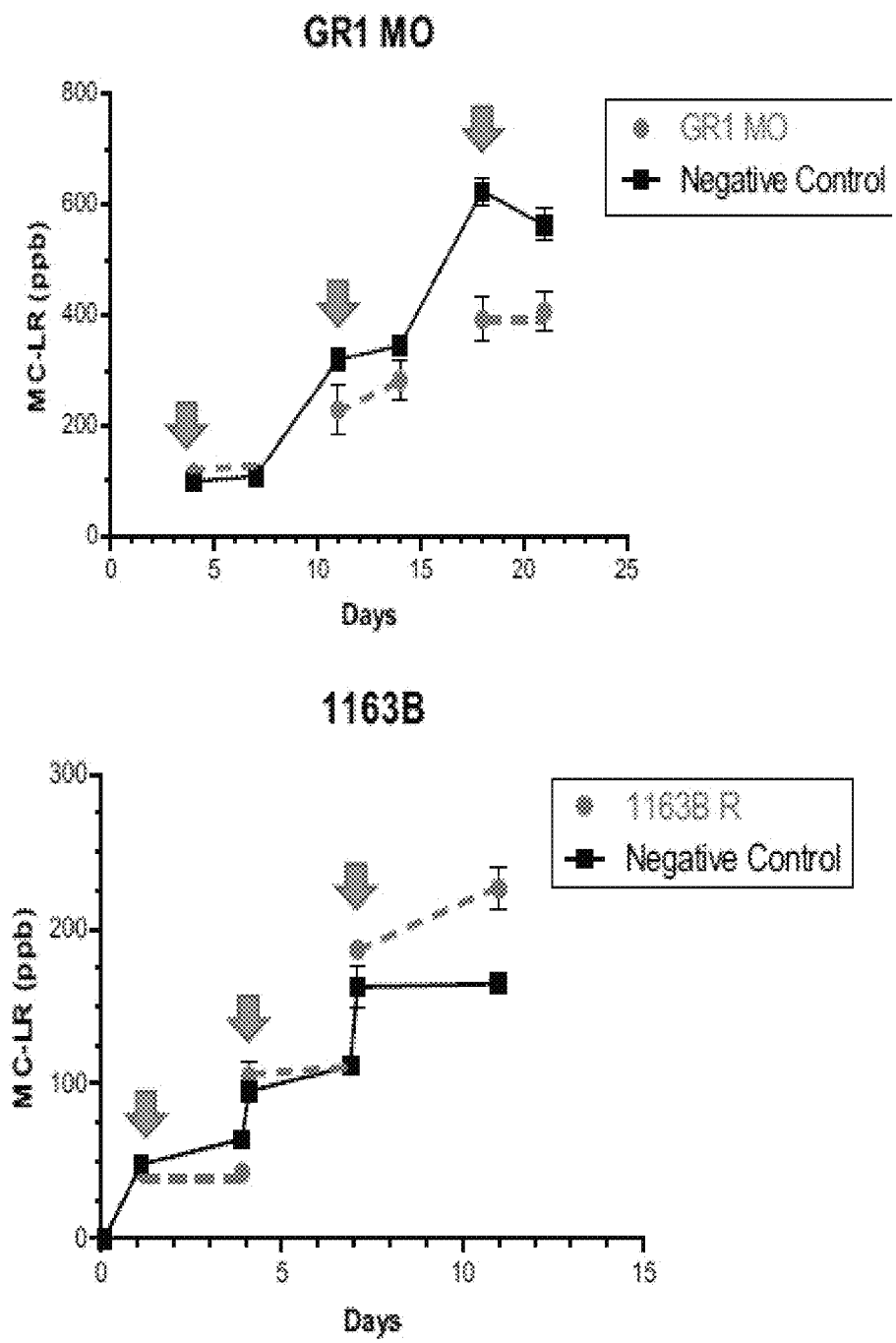
Figure 3E:
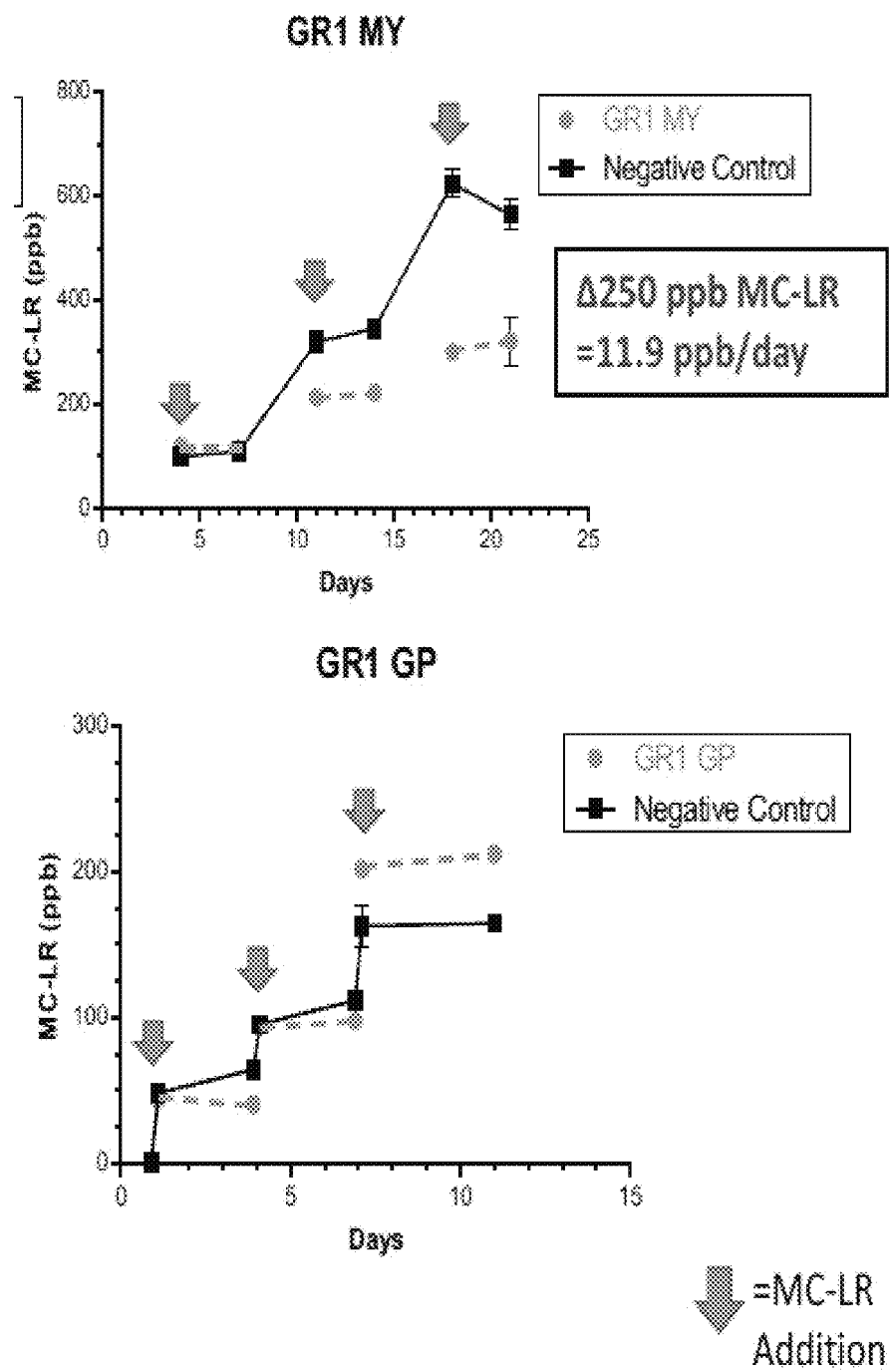
Figure 3F:
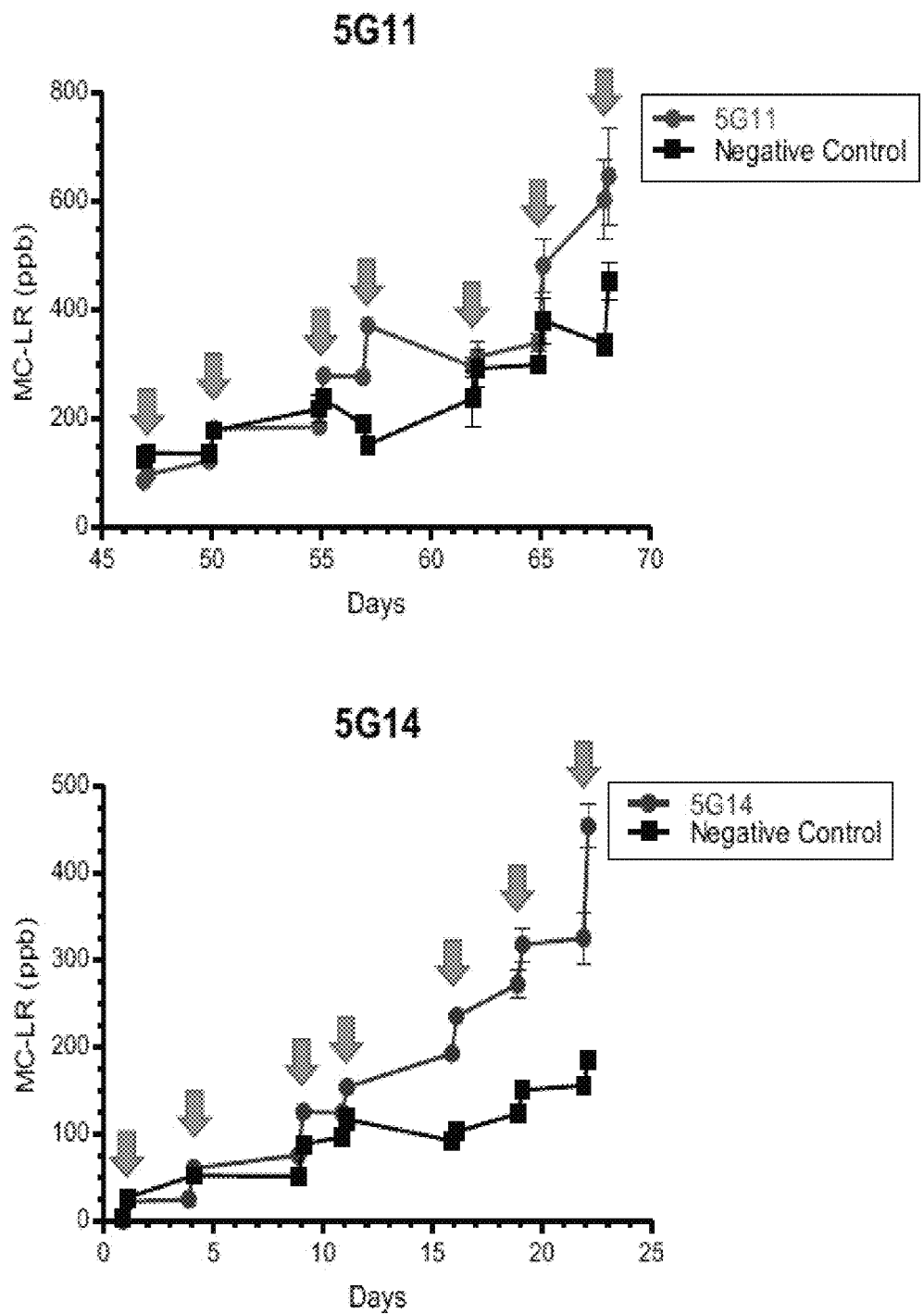
Figure 3F:
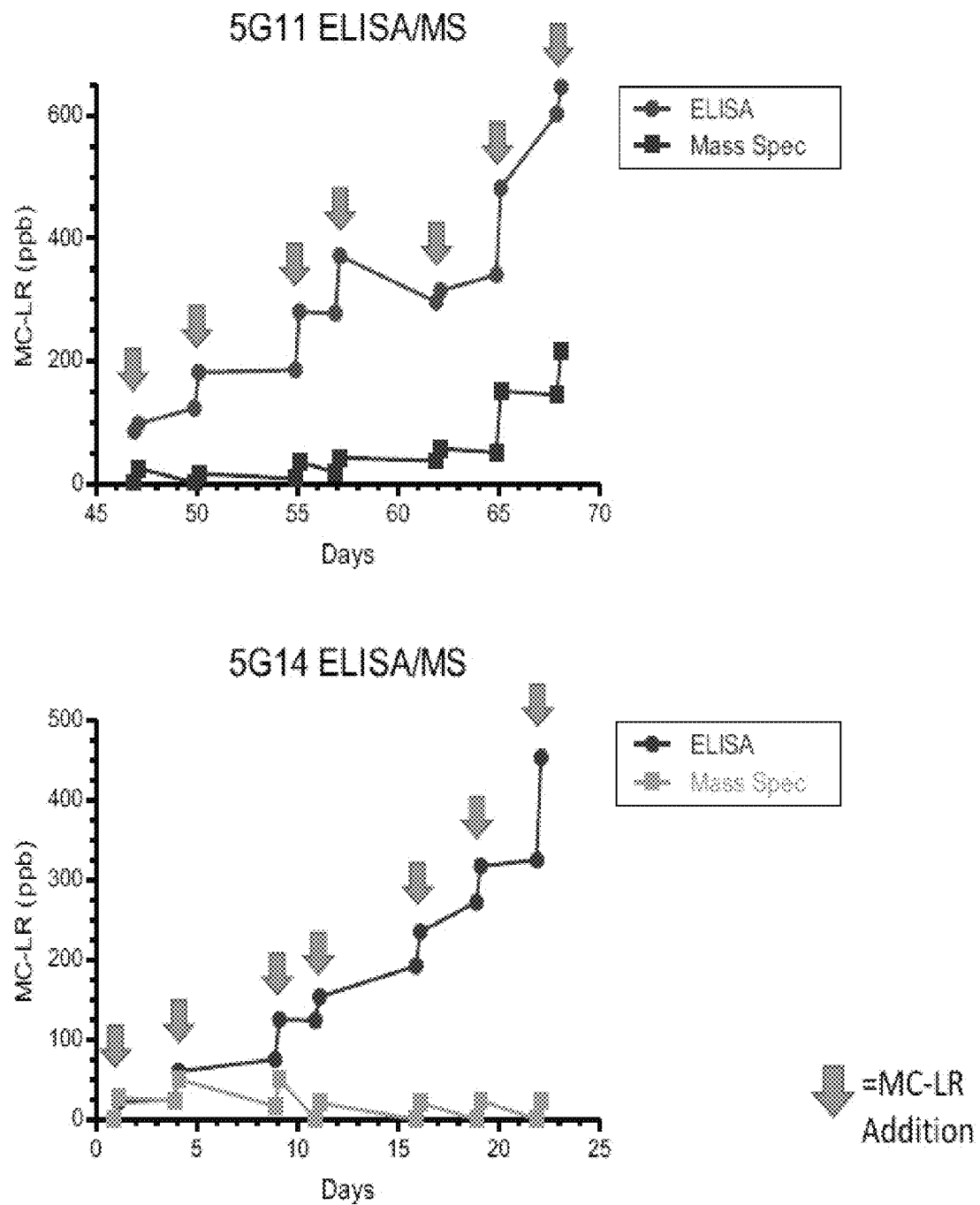
Figure 4A:
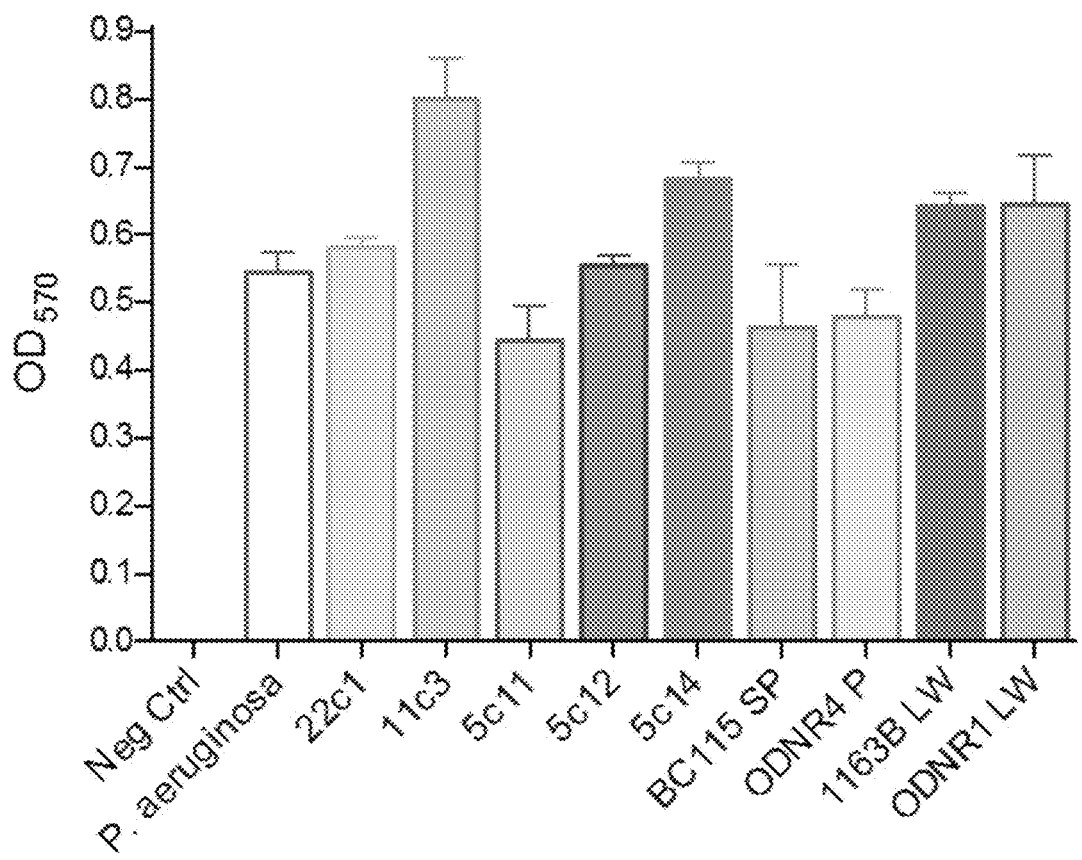
FIGS. 4A-4C: Biofilm formation by MC-LR degrading bacteria. Sterile-filtered lake water was either not inoculated (Neg Ctrl), inoculated with *P. aeruginosa*, or inoculated with a group of 22 clones (group 22c1), a group of 11 clones (group 11c3), groups of 4-5 clones/each (groups 5c11, 5c12, and 5c14), or individual bacterial clones (BC115 SP, ODNR4 P, 1163B LW, and ODNR 1LW; see Table 1 for more information) (FIG. 4A).
Figure 4B:
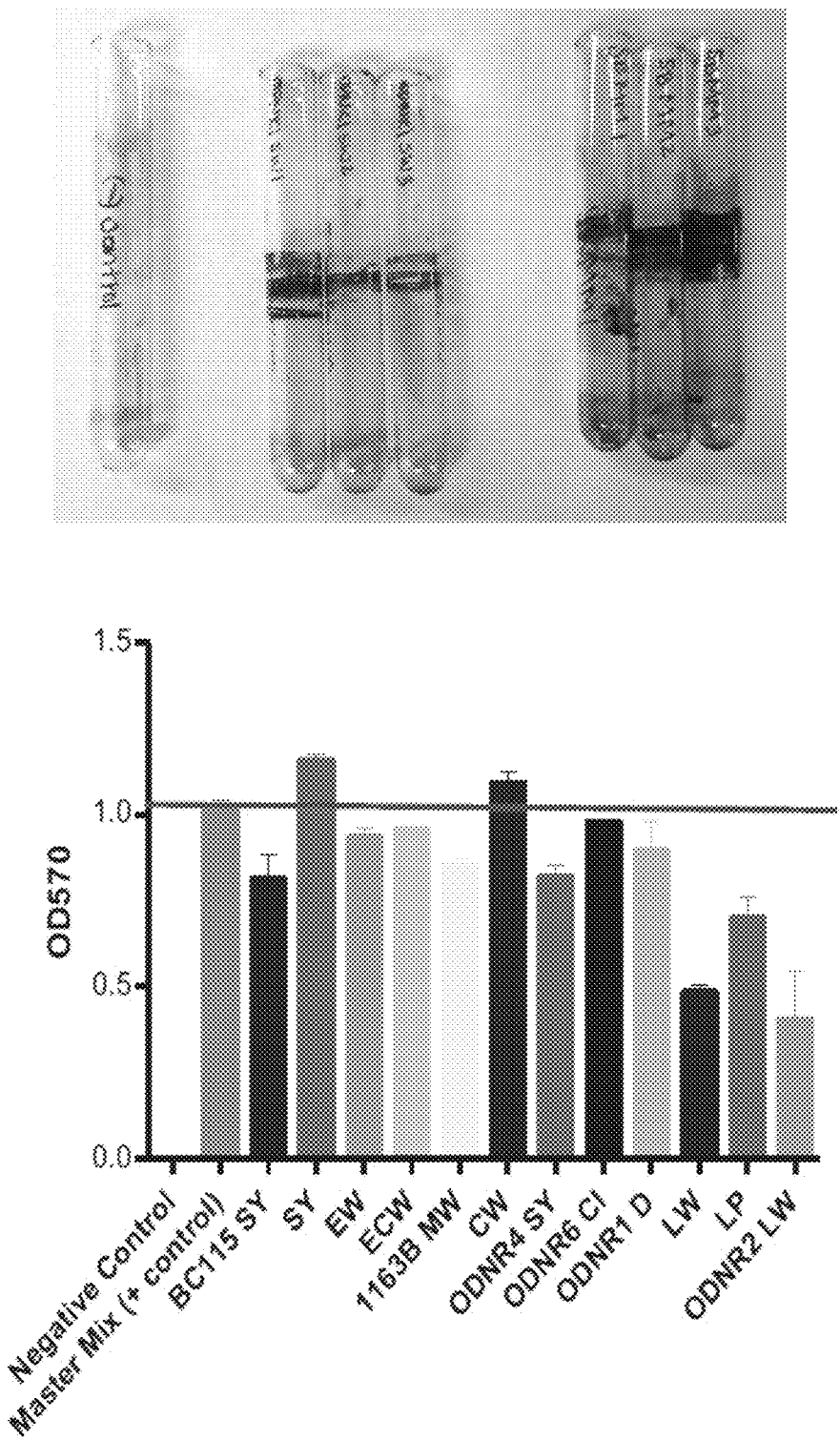
Figure 4C:
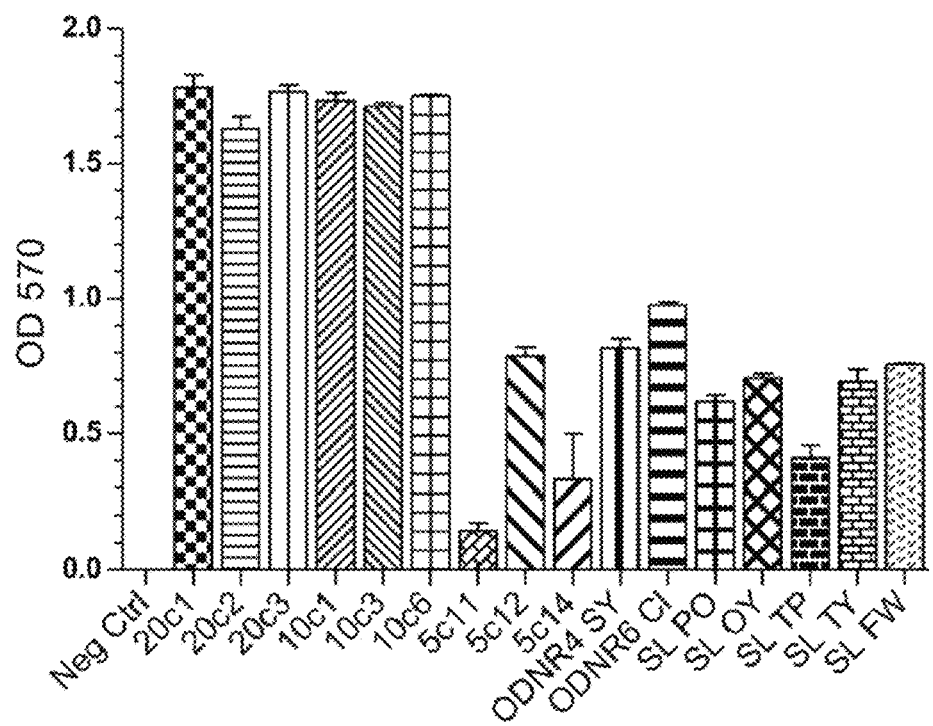

Despite encouraging MC-LR degradation from lake water samples containing large numbers of different bacteria (FIGS. 1D and 2), it was desired to identify a single bacterial clone, or small group of clones, that degrade MC-LR from water samples. Thus, whether smaller groups of bacterial clones were capable of degrading MC-LR was examined. Each of the 66 archived bacterial clones was individually grown, randomly assigned to groups of either 22 clones/group, 11 clones/group, 4-5 clones/group (see Table 1 for information about bacterial clone assignments to groups), or individual clones. These bacteria were inoculated into sterile-filtered lake water, with approx. 45 ppb MC-LR added every 3-5 days for 12 days (3 total MC-LR additions). Sterile-filtered lake water, without any bacterial inoculum, served as a negative control, with equal amounts of MC-LR added according to the same schedule. In general, MC-LR degradation by 22 clones/group (FIG. 3A), 11 clones/group (FIG. 3B), 4-5 clones/group (FIG. 3C), or individual clones (FIG. 3D) was not as robust as MC-LR degradation in our initial studies (FIGS. 1D and 2). For 22 clones/group samples, MC-LR degradation was detected in group 22c1 between days 8-12 (10 ppb degradation) and in group 22c2 between days 1-5 (2 ppb degradation; FIG. 3A). For 11 clones/group samples, no MC-LR degradation was detected for any group at any time (FIG. 3B). For 4-5 clones/group samples, MC-LR degradation was detected in group 5c12 between days 8-12 (23 ppb degradation) and in group 5c14 between days 1-5 (6 ppb degradation) and between days 5-8 (12 ppb degradation; FIG. 3C). Finally, although MC-LR degradation capability was assessed for 25 individual bacterial clones (Table 1), the most promising MC-LR degradation was observed from clone GR1 GB between days 1-5 (4 ppb degradation) and between days 5-8 (6 ppb degradation) and clone SL OY between days 1-5 (6 ppb degradation; FIG. 3D). For some bacteria-containing cultures (e.g. 22c1 and 11c3), MC-LR levels were unexpectedly higher at the end of the experiment than in the negative control samples (FIGS. 3A-3F), leading to the conclusion that some of the groups of bacterial clones may be degrading MC-LR into breakdown products which result in artificially high MC-LR values when using the commercial ELISA.

MC-LR Degrading Bacteria Form Biofilms

Given the above results demonstrating that Lake Erie bacterial clones can degrade MC-LR from lake water, and previous studies demonstrating that microcystin-degrading bacteria could degrade MC-LR in biologically-active sand filters (i.e. biofilters), the ability of the MC-LR degrading bacterial clones to form biofilms—which is an important aspect for biofilter development and testing—was evaluated. Cultures of 22 clones/group, 11 clones/group, 4-5 clones/group (Table 1), and individual bacterial clones were grown in sterile-filtered lake water and biofilm formation was assessed after 28 days. Negative controls consisted of sterile-filtered lake water only. Given the well-known ability of *Pseudomonas aeruginosa* to form biofilms on various surfaces, *P. aeruginosa* was grown in sterile-filtered lake water as a positive control. In general, nearly all of the MC-LR degrading bacterial clones, either individually or in groups, formed biofilms as robustly as *P. aeruginosa* (FIGS. 4A-4C). Interestingly, there did not appear to be any correlation between MC-LR degradation (FIGS. 3A-3F) and biofilm formation (FIGS. 4A-4C). Similarly, there did not appear to be any correlation between bacterial diversity (i.e., group of 22 clones, group of 11 clones, individual clones) and biofilm formation. Robust biofilm formation by all of the MC-LR degrading bacterial clones, either individually or in groups, demonstrates their ability to be used in biodegradation and biofilters.

Mass Spectrometry Analysis of MC-LR Degradation

MC-LR degradation by bacterial clones was re-tested with the following considerations: First, with respect to the development of biofilters, the use of individual bacterial clones, or a small number of bacterial clones, is preferable to large groups of bacterial clones. Smaller groups of bacterial clones have inherent safety and quality control advantages over larger and more complex groups of bacterial clones. Based on encouraging MC-LR degradation in previous studies (FIG. 3C), three different groups of 4-5 clones (5c11, 5c12, and 5c14; Table 1) were selected to degrade MC-LR. Second, mass spectrometry (MS) analysis was used to more accurately quantitate MC-LR levels and specifically detect MC-LR degradation products in each culture. Compared to the previous MC-LR degradation analyses using ELISA (FIGS. 1D, 2, and 3), MS analysis is much more accurate and allows for precise quantitation of both intact cyclic MC-LR and MC-LR breakdown products, which was important given some of the unexpected MC-LR levels detected in the previous degradation studies (FIGS. 3A-3F).

All cultures, including negative control cultures (not inoculated), were grown in sterile-filtered lake water, MC-LR was added every 3-5 days, aliquots were collected before and after MC-LR addition, and MC-LR levels were quantitated by MS analysis. Approx. 16 ppb MC-LR was added to each culture 4 times during the 16 day experiment, with approx. 64 ppb MC-LR quantitated in the negative control culture on day 16. By comparison, MS analysis of the 5c11, 5c12, and 5c14 cultures indicated total (ppb) and daily (ppb/day) MC-LR degradation of 30.8 (1.9/day), 14.3 (0.9/day), and 63.8 ppb (4.0/day), respectively (FIG. 5A).

Given the dramatic MC-LR degradation by group 5c14, secondary ion mass (SIM) spectrometry analysis was next used to detect MC-LR biodegradation products from those samples. A mass range from 130-1100 m/z was searched, targeting known MC-LR biodegradation products, including the ADDA fragment (332.22 m/z), the tetrapeptide (615.14 m/z), and the linearized form of MC-LR (1013.56 m/z). When day 1 samples were analyzed (immediately after MC-LR addition), no degradation products were present (i.e., only the native, cyclic 995 m/z molecule was detected; FIG. 5B). However, at later time points (e.g., day 16), cyclic MC-LR (995 m/z) was absent, but defined peaks for the tetrapeptide (615.14 m/z at 1.6 minutes) and the linearized form of MC-LR (1013.56 m/z at 2.5 minutes) were readily detected (FIG. 5C). These results not only confirm the earlier MC-LR degradation findings (FIGS. 1D, 2, 3A-3F) but, more importantly, provide detailed identifications of MC-LR biodegradation products from Lake Erie bacteria.

m1rABCD Degradation Genes are not Present in Lake Erie Bacterial Clones

Previous studies in Australia and China found that MC-LR degrading bacteria degrade MC-LR by a series of enzymes encoded by the mlrABCD operon. However, given the geographical and limnological differences between the water sources for those MC-LR degrading isolates and Lake Erie, whether the isolated MC-LR degrading Lake Erie bacterial clones contained any of the m1r genes was assessed. Given that the most robust MC-LR degradation was observed from cultures 5c11, 5c12, and 5c14 (FIG. 5A), and that 5c14 was found to biodegrade MC-LR into linearized MC-LR and tetrapeptide breakdown products (FIG. 5C), it was attempted to PCR-amplify mlrA, mlrB, and mlrC from each of the 13 clones making up groups 5c11, 5c12, and 5c14 (see Table 1). mlrA, mlrB, and mlrC primers were designed based on conserved regions within all available sequences in the NCBI database. Primers for 16S rRNA served as an internal control for DNA integrity and PCR amplification (FIG. 6). *Sphingomonas* sp. ACM3962, a MC-LR degrading bacteria isolated from Australia that previously has been shown to contain the mlrABC genes, served as a positive control for our mlrA, mlrB, and mlrC amplifications. Whereas a 16S rRNA product was amplified for *Sphingomonas* sp. ACM3962 and all 13 of the MC-LR degrading clones, mlrA, mlrB, and mlrC only were amplified from *Sphingomonas* sp. ACM3962 (FIG. 6). Although an incorrectly-sized mlrC product was amplified from clone ODNR1 LW (genotyped as *Pseudomonas putida* by 16s rRNA sequencing; Table 1), DNA sequencing of this product did not align to any known mlrC nucleotide sequences. Instead, BLASTn analysis of this amplicon revealed weak homology to a sequence fragment from the *Pseudomonas umsongensis* strain BS3657 chromosome 1 genome assembly, indicating that this aberrant amplicon is not a cryptic mlrC gene. Whereas it remains possible that a highly divergent mlrABCD operon, or mlrABCD genes, exist(s) in the MC-LR degrading bacterial clones, negative amplification results strongly argue against the existence of the mlrABCD operon in MC-LR degrading bacteria in Lake Erie.

Biodegradation of MC-LR and MC-RR by Randomed Groups of 4-5 Bacterial Clones

Bacterial clones from Table 1 assigned to groups 5c11, 5c12, and 5c14 were incubated in sterile-filtered lake water. The respective microcystin congener was added every 3-5 days (indicated by blue arrows in FIG. 9), and sample aliquots were removed before and after microcystin addition. Sterile-filtered water without any bacterial clones served as a negative control (Neg Ctrl). Microcystin levels in each sample were quantitated by mass spectrometry analysis.

As seen in FIG. 9, bacterial group 5c11 degraded 152 ppb total MC-LR (6.9 ppb/day), group 5c12 degraded 188 ppb total MC-LR (8.5 ppb/day), and group 5c14 degraded 296 ppb total MC-LR (13.4 ppb/day) (FIG. 9). By comparison, bacterial group 5c11 did not degrade MC-RR, group 5c12 degraded 70 ppb total MC-RR (3.2 ppb/day), and group 5c14 degraded 80 ppb total MC-RR (3.6 ppb/day) (FIG. 9). In addition, bacterial group 5c14 was found to degrade 46 ppb (2.1 ppb/day) of MC-LA. Degradation by groups of 22 clones per group, 11 clones per group, and individual clones also was demonstrated. Taken together, these data demonstrate that the isolated microcystin-degrading bacteria, including selected groups of 4-5 bacterial clones, can biodegrade microcystin toxin congeners.

DISCUSSION

Microcystin-degrading bacteria have been documented in eutrophic water bodies all over the world. However, surprisingly little is known about microcystin-degrading bacteria in Lake Erie, despite the increasing incidence of Lake Erie HABs over the past few decades, culminating in the August 2014 city of Toledo, Ohio 3-day drinking water ban due to unsafe MC-LR levels. One previous study used metagenomic analysis to identify potential MC-LR degrading bacteria in Lake Erie. While those researchers identified a wide variety of bacterial phyla which increased in abundance in the presence of 15 ppb MC-LR, MC-LR only was added once, and samples only were exposed to MC-LR for 48 hours. By comparison, the present example subjected scum samples to a rigorous enrichment process, whereby scum samples were: collected from multiple locations throughout the western basin of Lake Erie; collected during multiple years; repeatedly exposed to high levels of MC-LR (16-70 ppb) for >12 days; exposed to light-dark cycles to simulate the natural lake environment; MC-LR levels were quantitated from lysed samples to examine free, bound, and internalized MC-LR; MC-LR degrading bacteria were isolated and retested for MC-LR degradation in small groups; and MC-LR biodegradation products were identified by mass spectrometry analysis, confirming that biodegradation is actually occurring.

MC-LR reductions in the experiments could be attributed to many factors, including bacterial adsorption of MC-LR, bacterial internalization of MC-LR, MC-LR complex formation with organic or inorganic materials in lake water, MC-LR degradation by abiotic/secreted enzymes, or bacterial biodegradation of MC-LR. Here, multiple approaches were used to verify that the selection process resulted in the enrichment for and isolation of bona fide MC-LR degrading bacteria from Lake Erie scum samples. First, it was demonstrated that dramatic phenotypic changes in bacterial colony morphologies occured between the beginning and end of the experiment (FIG. 1B), indicating bacterial population changes during 4 weeks of continuous MC-LR additions. Second, it was demonstrated that bacterial numbers increased during the 4-week MC-LR selection process (FIG. 1C), indicating that distinct bacterial populations were able to replicate via the utilization of MC-LR as a nutrient source. Third, the results demonstrated substantial heterogeneity in MC-LR biodegradation rates (e.g., degradation per day; total degradation per experiment) by Lake Erie bacterial populations (FIGS. 1D, 2, 3A-3F, and 5A; Table 1). Fourth, although there were occasional anomalies in MC-LR concentrations in sterile-filtered lake water (i.e. negative control samples), MC-LR levels generally increased to expected levels in all negative controls (FIGS. 2, 3A-3F, and 5A-5C), indicating that any quantitated MC-LR decreases in bacterial-containing samples were most likely due to intracellular bacterial degradation, and not soluble enzymes or substrate interference in lake water. Fifth, any MC-LR adsorption to bacteria or MC-LR internalization without degradation was accounted for by the use of the Ohio EPA total microcystins methodology for all samples, which included three sequential freeze-boil steps to lyse bacteria and release MC-LR (see Methods). Finally, mass spectrometry identification of well-known and substantially less-toxic MC-LR biodegradation products, including linearized MC-LR (1013 m/z) and the tetrapeptide fragment (615 m/z), from the bacterial clone cultures, further indicates that the rigorous selection process resulted in the isolation of microcystin-degrading bacterial clones.

Figure 5A:
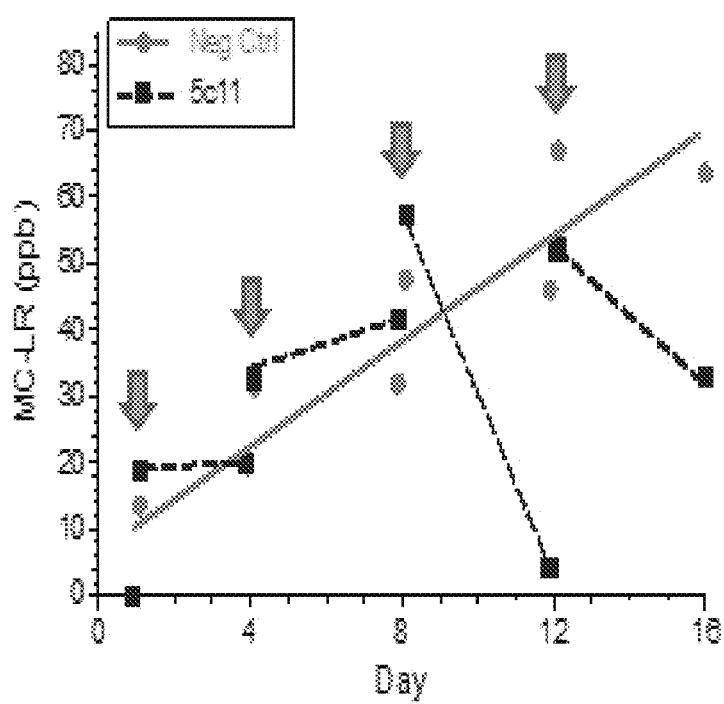
FIGS. 5A-5C: Groups of 4-5 bacterial clones degrade MC-LR.
Figure 5A:
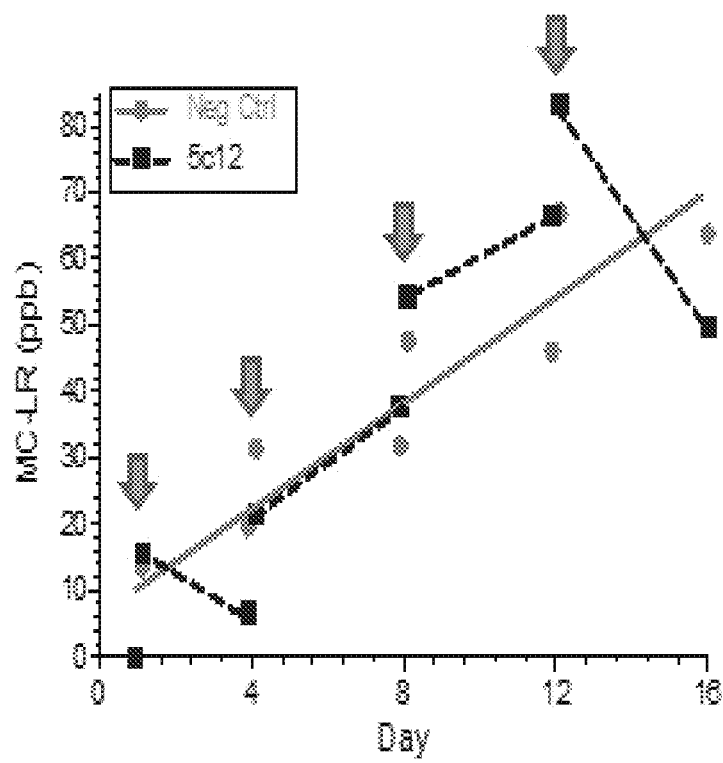
Figure 5A:
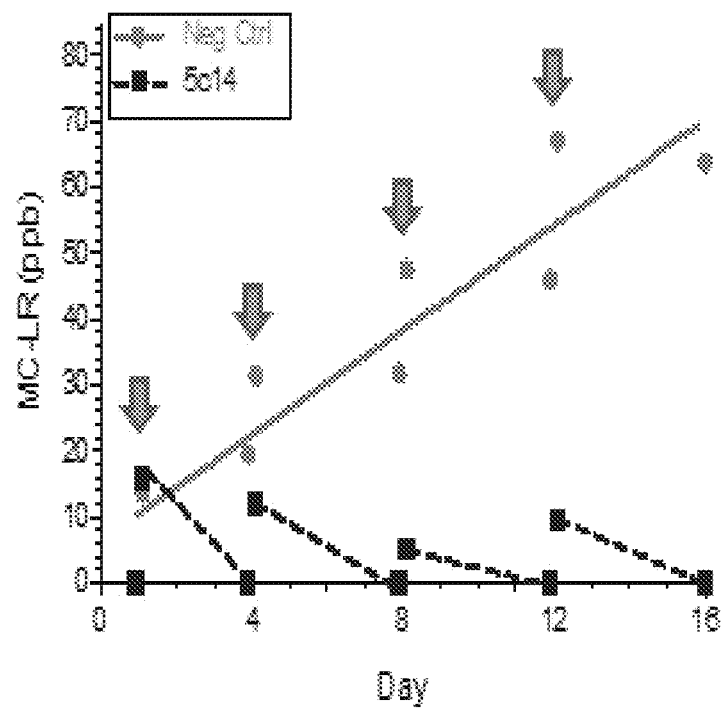
Figure 5B:
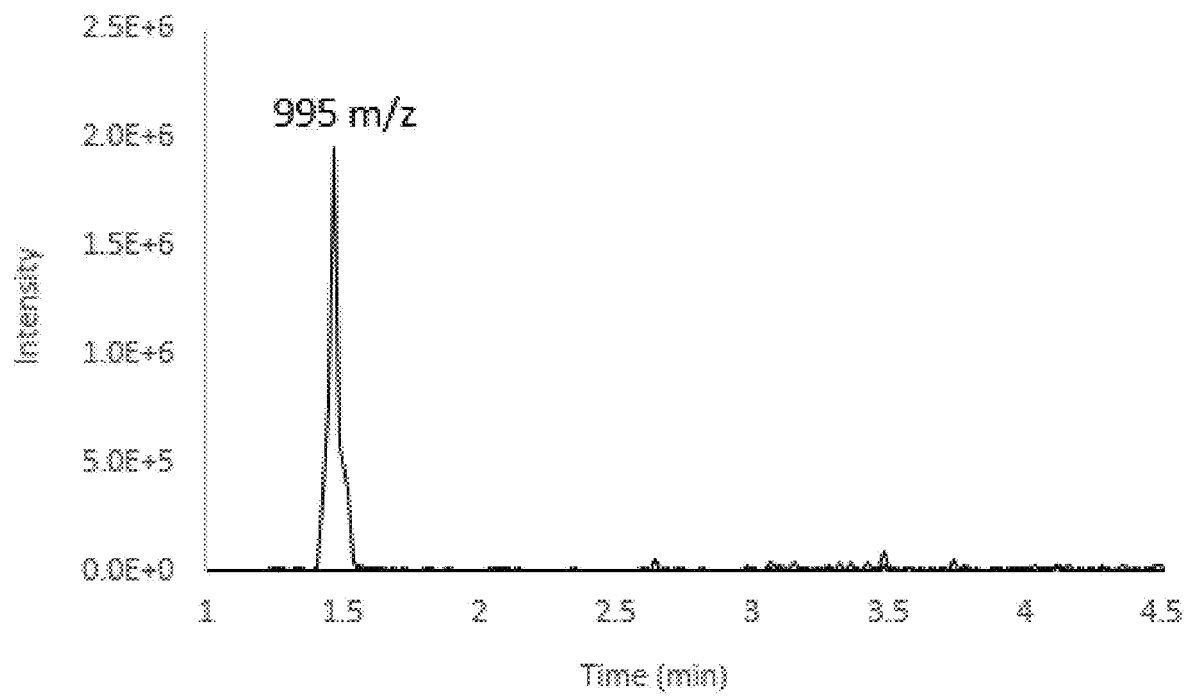
Figure 5C:
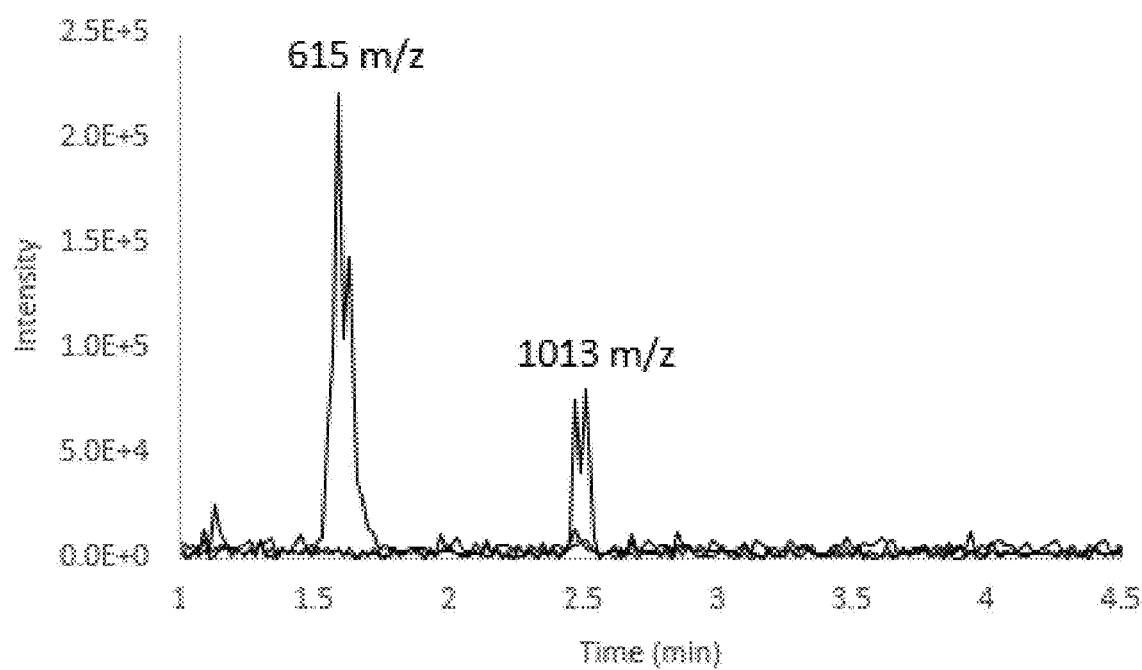
Figure 6:
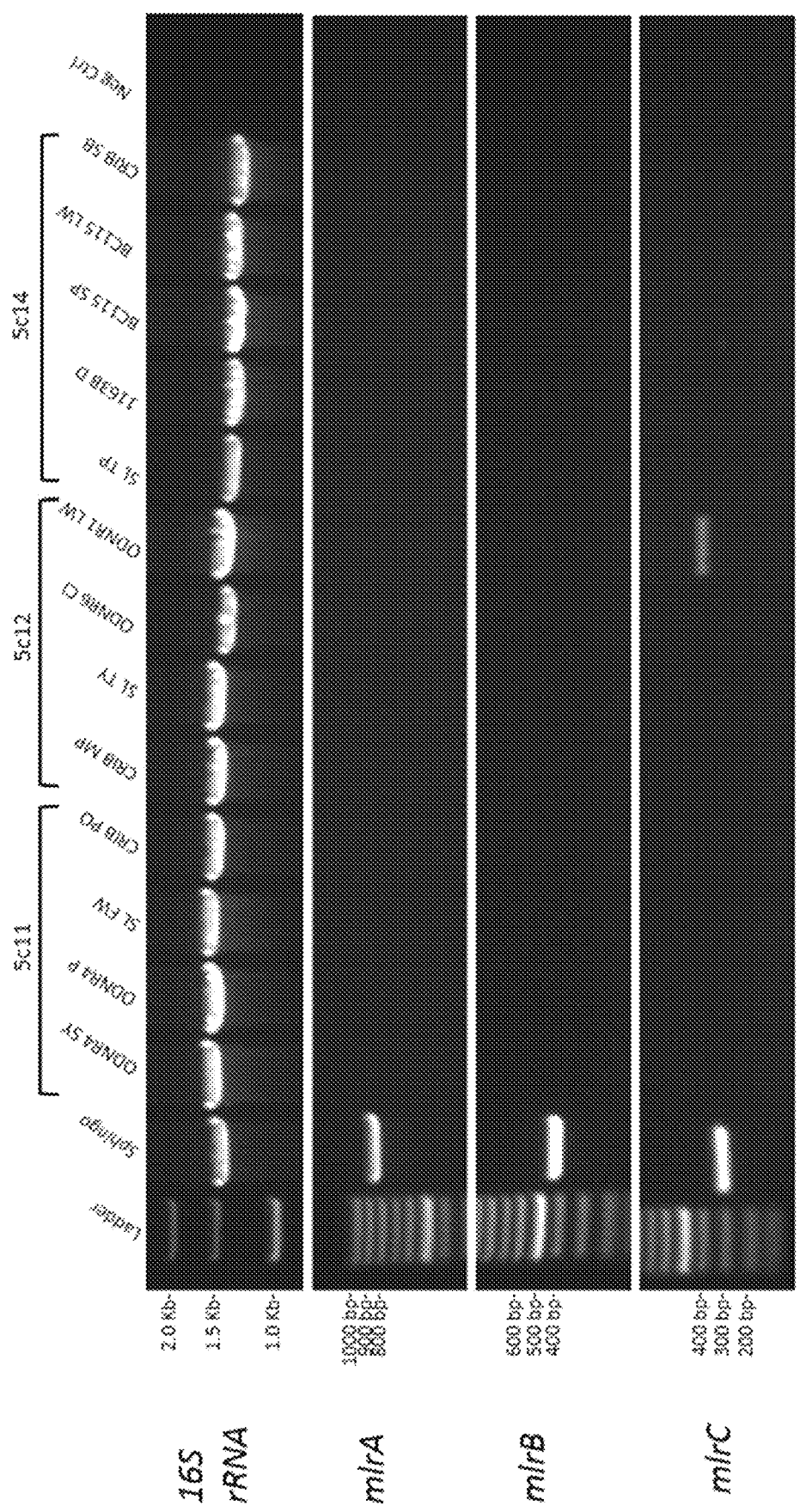
FIG. 6: PCR amplification of known MC-LR degradation genes, mlrABC, from MC-LR degrading bacterial clones isolated. DNA was purified from either *Sphingomonas* sp. ACM3962 (Sphingo; positive control) or 13 bacterial clones that were randomly assorted into 3 groups of 4-5 clones per group (groups 5c11, 5c12, and 5c14). PCR was performed using primers for either 16S rRNA, mlrA, mlrB, or mlrC. A negative control sample (Neg Ctrl) contained molecular grade water only.

The most robust microcystin biodegradation was observed from diverse groups of bacterial clones, including the Stone Lab water sample (FIG. 2) and cultures containing 4-5 clones/group (FIG. 5A). Although the ability of 25 individual bacterial clones to biodegrade MC-LR, results were not encouraging (FIG. 3D, Table 1). Whereas it is possible that MC-LR biodegradation may be demonstrated from untested individual clones in the archived samples, the lack of biodegradation by individual clones thus far indicates that two or more bacterial species may be necessary for MC-LR biodegradation. Without wishing to be bound by theory, it is believed that more than two bacteria may be needed for MC-LR degradation, where one bacterial species initiates MC-LR cleavage, followed by co-metabolism of remaining breakdown products by other bacterial species. This is in contrast to studies from other countries demonstrating that a single bacterial species (e.g., *Sphingomonas* sp. or *Stenotrophomonas* sp. could biodegrade MC-LR, although such study did indicate high levels of MC-LR degradation by unfiltered water samples, which did not contain any *Sphingomonas* sp., highlighting that groups of bacteria may cooperatively degrade MC-LR).

An important result from this example is that microcystin degrading bacteria may be used in biologically-active sand filters (i.e., biofilters) to remove and degrade MC-LR from drinking water. Whereas one previous study explored the ability of sand filters inoculated with MC-LR degrading bacteria to degrade MC-LR, there has been little follow-up on MC-LR degrading biofilters. Biofilters may be a cost-effective and environmentally-friendly supplement to, or replacement for, conventional water treatment processes (e.g., activated charcoal, ozonation, chlorine, etc.).

Of the 66 bacterial clones sequenced in this example (42 distinct genus-species), only two were remotely associated with human disease. Importantly, those two bacterial clones were not found to degrade MC-LR, either individually or in groups (Table 1).

For biofilter viability, MC-LR degrading bacteria should be able to form robust biofilms on sand particles to avoid being washed off and should survive in sand filters with no added nutrients. Here, it was demonstrated that selected bacterial groups, such as 5c14, formed biofilms on siliconized glass tubes (FIGS. 4A-4B), degraded MC-LR (FIGS. 5A-5C), and performed both functions in sterile-filtered lake water.

Biofilters may be able to degrade microcystin levels up to, and ideally exceeding, those currently plaguing municipal water utilities. During the 2014 city of Toledo water crisis, 2.5 ppb MC-LR was detected in finished water and publically-available data from the Ohio EPA indicates that >5 ppb MC-LR was detected in multiple raw water samples from Lake Erie during the summer of 2017. In this example, it was demonstrated that the isolated bacterial clones could degrade 0.9-19 ppb/day MC-LR (FIGS. 1D, 2, 3, and 5). Together with biofilm data, these results indicate that the MC-LR degrading bacteria may be used in biofilters.

DNA was from each of the microcystin toxin (MC-LR) degrading bacterial isolates (13 different bacterial isolates), and performed whole-genome sequencing of each bacterial isolate was performed. (see Table 2 below).

Each genome is assembled, taking 700,000 to 3,000,000 nucleotide sequence reads per isolate and assembling the sequence reads into a genome map). Whole genome sequencing of each bacterial isolate provides information about exactly what type (genus, species, strain, or newly identified strain) of bacteria degrades MC-LR.

The complete genome sequences can provide detailed information about gene arrangements in each bacterial isolate and help identify the pathways/enzymes responsible for MC-LR degradation.

TABLE 2

List of bacteria sequenced and information about genome sequencing data.

| Degradation Group | K | K | K | K | |
|---|---|---|---|---|---|
| Isolate name | ODNR4 P | ODNR4 SY | CRIB PO | SL FW | |
| Putative genus species | *Flectobacillus roseus* | *Pseudomonas hunanesis* | *Leadbetterella byssophila* | *Pseudomonas abietaniphila* | |
| Sequencing Reads | 2388911 | 841168 | 3179355 | 996033 | |
| Contigs | 349 | 296 | 197 | 166 | |
| GC Content | 37% | 62% | 43% | 50% | |
| Degradation Group | L | L | L | L | |
| Isolate name | ODNR1 LW | ODNR6 CL | CRIB MP | SL TY | |
| Putative genus species | *Pseudomonas putida* | *Spingobium yanoikuyae* | *Runella* sp. THWCSN44 | *Pseudomonas* sp. CC15M4 | |
| Sequencing Reads | 1244030 | 1031645 | 2113625 | 1536802 | |
| Contigs | 1077 | 6035 | 5171 | 210 | |
| GC Content | 50% | 63% | 42% | 66% | |
| Degradation Group | N | N | N | N | N |
| Isolate name | BC115 SP | 1163B D | CRIB SB | SL TP | BC115 LW |
| Putative genus species | *Flectobacillus sp* | *Spingobium yanoikuyae* | *Rhizobium rosettiformans* | *Porphyrobacter* sp. | *Pseuclomonas migulae* |
| Sequencing Reads | 2804750 | 1006399 | 1247980 | 957166 | 731624 |
| Contigs | 356 | 3636 | 504 | 132 | 5686 |
| GC Content | 37% | 65% | 66% | 64% | 59% |

CONCLUSION

This example found that Lake Erie bacteria can be used to remove and degrade the microcystin toxin MC-LR from water supplies. To accomplish this, Lake Erie water samples were collected from HAB events during different years, and MC-LR was continuously added to each water sample for 3-4 weeks to select for MC-LR degrading bacteria. MC-LR was quantitated before and after each MC-LR addition, and individual MC-LR-degrading bacterial clones were isolated from each culture at the end of each experiment. In addition to demonstrating MC-LR degradation by large groups of unknown/undefined bacteria, this example genotyped individual bacterial clones to exclude potential human pathogens, and re-examined MC-LR degradation by smaller, defined groups of bacterial clones, proving that groups of 4-5 clones can degrade MC-LR. In addition, mass spectrometry analysis was used to identify MC-LR breakdown products, confirming that biodegradation occurs and verifying that non-toxic breakdown products can be generated by Lake Erie bacteria. Finally, all of the isolated MC-LR degrading bacterial strains, either individually or in groups, were found to form robust biofilms, supporting their use in biofilters.

Certain embodiments of the compositions, devices, and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A biofilter comprising:
   a medium; and
   a biofilm on the medium, wherein the biofilm is formed from a group of bacteria capable of degrading a microcystin compound when combined together, wherein the group of bacteria comprises one of:
   (i) ODNR4P; ODNR4SY, CRIBPO, and SLFW; or
   (ii) ODNR1LW, ODNR6CL, CRIBMP, and SLTY; or
   (iii) BC115SP, 1163BD, CRIBSB, SLTP, and BC115LW.

2. The biofilter of claim 1, wherein the medium comprises sand, gravel, polyurethane foam, peat, compost, woodchips, seashells, plastics, pumice, siliconized glass, or a combination thereof.

3. The biofilter of claim 1, wherein the medium is disposed on a substrate.

4. The biofilter of claim 3, wherein the substrate is a perforated plate or a porous paper.

5. The biofilter of claim 1, wherein the group of bacteria comprises bacteria species that individually do not degrade the microcystin compound.

6. The biofilter of claim 1, wherein the group of bacteria comprises (i) ODNR4P; ODNR4SY, CRIBPO, and SLFW.

7. The biofilter of claim 1, wherein the group of bacteria comprises (ii) ODNR1LW, ODNR6CL, CRIBMP, and SLTY.

8. The biofilter of claim 1, wherein the group of bacteria comprises iii) BC115SP, 1163BD, CRIBSB, SLTP, and BC115LW.

9. The biofilter of claim 1, wherein the group of bacteria further includes one or more of:
   Acinetobacter haemolyticus, Acinetobacter johnsonii, Agrobacterium albertimagni, Asticcacaulis biprosthecium, Bacillus cereus, Bacillus mycoides, Brevundimonas nasdae, Brevundimonas subvibrioides, Dyadobacter fermentans, Emticicia oligotrophica, Emticicia sediminis, Flavobacterium akiainvivens, Flectobacillus roseus, Flectobacillus sp., Gemmobacter sp., Hydrogenophage intermedia, Ideonella paludis, Leadbetterella byssophila, Microbacterium hominis, Microbacterium proteolyticum, Microbacterium testaceum, Microbacterium trichothecenolyticum, Novosphingobium aromaticivorans, Novosphingobium resinovorum, Porphyrobacter sp., Pseudomonas abietaniphila, Pseudomonas alcaligenes, Pseudomonas alkylphenolia, Pseudomonas hunanensis, Pseudomonas migulae, Pseudomonas pecoglossicida, Pseudomonas putida, Pseudomonas rhizosphaerae, Pseudomonas salomonii, Pseudomonas sp., Rhizobium selenitireducens, Rhizobium sp., Runella sp., Shinella sp., Sphingobium xenophagum, Sphingobium yanoikuyae, or Variovorax paradoxus.

10. The biofilter of claim 1, wherein the biofilter comprises a column packed with a plurality of media.

11. The biofilter of claim 10, wherein the biofilm is formed on more than one of the plurality of media.

12. The biofilter of claim 1, wherein the biofilter comprises a permeable tube defining a tubular channel, wherein the medium is adhered to an outer surface of the permeable tube.

13. The biofilter of claim 1, wherein the microcystin compound is MC-LR.

14. A method of filtering water to remove microcystin, the method comprising
   passing water through a filter comprising a biofilm formed from a group of bacteria capable of degrading a microcystin compound,
   wherein the group of bacteria comprises bacteria which do not individually degrade the microcystin compound; and,
   wherein the group of bacteria includes one or more of:
   Acinetobacter haemolyticus, Acinetobacter johnsonii, Agrobacterium albertimagni, Asticcacaulis biprosthecium, Bacillus cereus, Bacillus mycoides, Brevundimonas nasdae, Brevundimonas subvibrioides, Dyadobacter fermentans, Emticicia oligotrophica, Emticicia sediminis, Flavobacterium akiainvivens, Flectobacillus roseus, Flectobacillus sp., Gemmobacter sp., Hydrogenophage intermedia, Ideonella paludis, Leadbetterella byssophila, Microbacterium hominis, Microbacterium proteolyticum, Microbacterium testaceum, Microbacterium trichothecenolyticum, Novosphingobium aromaticivorans, Novosphingobium resinovorum, Porphyrobacter sp., Pseudomonas abietaniphila, Pseudomonas alcaligenes, Pseudomonas alkylphenolia, Pseudomonas hunanensis, Pseudomonas migulae, Pseudomonas pecoglossicida, Pseudomonas putida, Pseudomonas rhizosphaerae, Pseudomonas salomonii, Pseudomonas sp., Rhizobium selenitireducens, Rhizobium sp., Runella sp., Shinella sp., Sphingobium xenophagum, Sphingobium yanoikuyae, or Variovorax paradoxus.

15. The method of claim 14, wherein the group of bacteria comprises ODNR4P; ODNR4SY, CRIBPO, and SLFW.

16. The method of claim 14, wherein the group of bacteria comprises ODNR1LW, ODNR6CL, CRIBMP, and SLTY.

17. The method of claim 14, wherein the group of bacteria comprises BC115SP, 1163BD, CRIBSB, SLTP, and BC115LW.

18. The method of claim 14, wherein the microcystin compound is MC-LR.

19. A kit for filtering water, the kit comprising:
   a first container housing a substrate; and
   a second container housing a biologic medium comprising a biofilm formed from a group of bacteria capable of degrading a microcystin compound when combined together.

20. The kit of claim 19, wherein the group of bacteria is selected from
   (i) ODNR4P; ODNR4SY, CRIBPO, and SLFW; or
   (ii) ODNR1LW, ODNR6CL, CRIBMP, and SLTY; or
   (iii) BC115SP, 1163BD, CRIBSB, SLTP, and BC115LW.

21. The kit of claim 20, wherein the group of bacteria further includes one or more of:

*Acinetobacter haemolyticus, Acinetobacter johnsonii, Agrobacterium albertimagni, Asticcacaulis biprosthecium, Bacillus cereus, Bacillus mycoides, Brevundimonas nasdae, Brevundimonas subvibrioides, Dyadobacter fermentans, Emticicia oligotrophica, Emticicia sediminis, Flavobacterium akiainvivens, Flectobacillus roseus, Flectobacillus* sp., *Gemmobacter* sp., *Hydrogenophage intermedia, Ideonella paludis, Leadbetterella byssophila, Microbacterium hominis, Microbacterium proteolyticum, Microbacterium testaceum, Microbacterium trichothecenolyticum, Novosphingobium aromaticivorans, Novosphingobium resinovorum, Porphyrobacter* sp., *Pseudomonas abietaniphila, Pseudomonas alcaligenes, Pseudomonas alkylphenolia, Pseudomonas hunanensis, Pseudomonas migulae, Pseudomonas pecoglossicida, Pseudomonas putida, Pseudomonas rhizosphaerae, Pseudomonas salomonii, Pseudomonas* sp., *Rhizobium selenitireducens, Rhizobium* sp., *Runella* sp. *Shinella* sp., *Sphingobium xenophagum, Sphingobium yanoikuyae,* or *Variovorax paradoxus.*

\* \* \* \* \*

SEQUENCE LISTING

<160> NUMBER OF SEQ ID NOS: 8

<210> SEQ ID NO 1
<211> LENGTH: 20
<212> TYPE: DNA
<213> ORGANISM: Artificial Sequence
<220> FEATURE:
<223> OTHER INFORMATION: Description of Artificial Sequence: Synthetic primer

<400> SEQUENCE: 1
agagtttgat cctggctcag                                          20

<210> SEQ ID NO 2
<211> LENGTH: 19
<212> TYPE: DNA
<213> ORGANISM: Artificial Sequence

```
<220> FEATURE:
<223> OTHER INFORMATION: Description of Artificial Sequence: Synthetic
      primer

<400> SEQUENCE: 2
ggttaccttg ttacgactt                                                  19

<210> SEQ ID NO 3
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 3
gacccgatgt tcaagatgct                                                 20

<210> SEQ ID NO 4
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 4
ctcctcccac aaatcaggac                                                 20

<210> SEQ ID NO 5
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 5
atccgcacct atctgcctga c                                               21

<210> SEQ ID NO 6
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 6
gtcgccatag ccttgccag                                                  19

<210> SEQ ID NO 7
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 7
gcttgatcgt cgaacattga tgg                                             23

<210> SEQ ID NO 8
<211> LENGTH: 17
<212> TYPE: DNA
<213> ORGANISM: Artificial Sequence
<220> FEATURE:
```

```
<223> OTHER INFORMATION: Description of Artificial Sequence: Synthetic
      primer

<400> SEQUENCE: 8
cggcatggcg aaggcac                                                    17
```